(12) United States Patent
Yano

(10) Patent No.: US 9,361,067 B1
(45) Date of Patent: Jun. 7, 2016

(54) SYSTEM AND METHOD FOR PROVIDING A SOFTWARE DEVELOPMENT KIT TO ENABLE CONFIGURATION OF VIRTUAL COUNTERPARTS OF ACTION FIGURES OR ACTION FIGURE ACCESSORIES

(71) Applicant: Jumo Inc., Camden, DE (US)

(72) Inventor: Keiichi Yano, Tokyo (JP)

(73) Assignee: Jumo, Inc., Camden, DE (US)

( * ) Notice: Subject to any disclaimer, the term of this patent is extended or adjusted under 35 U.S.C. 154(b) by 0 days.

(21) Appl. No.: 14/645,228

(22) Filed: Mar. 11, 2015

(51) Int. Cl.
*G06F 9/44* (2006.01)
*A63F 9/24* (2006.01)
*A63F 13/20* (2014.01)
*A63F 13/40* (2014.01)

(52) U.S. Cl.
CPC . *G06F 8/00* (2013.01); *A63F 13/20* (2014.09); *A63F 13/40* (2014.09)

(58) Field of Classification Search
CPC ........... G06F 8/00; A63F 13/06; A63F 13/10; A63F 13/20; A63F 13/40
USPC .................................. 717/100; 463/30, 36–38
See application file for complete search history.

(56) References Cited

U.S. PATENT DOCUMENTS

| 5,766,077 | A |   | 6/1998  | Hongo .............................. 463/30     |
| 6,012,961 | A | * | 1/2000  | Sharpe et al. .................. 446/298        |
| 6,159,101 | A | * | 12/2000 | Simpson .......................... 463/46       |
| 6,290,565 | B1|   | 9/2001  | Galyean, III et al. ............ 446/99         |
| 6,354,947 | B1|   | 3/2002  | Dobrusskin et al. ............. 463/43          |
| 6,773,325 | B1|   | 8/2004  | Mawle et al. .................. 446/175         |
| 7,066,781 | B2|   | 6/2006  | Weston .......................... 446/268       |
| 7,502,759 | B2|   | 3/2009  | Hannigan et al. ............... 705/51          |
| 7,610,233 | B1|   | 10/2009 | Leong et al. ..................... 705/37       |
| 7,828,295 | B2| * | 11/2010 | Matsumoto et al. .......... 273/238             |
| 7,843,471 | B2|   | 11/2010 | Doan et al. ..................... 345/633       |
| 7,862,428 | B2|   | 1/2011  | Borge ............................. 463/29      |
| 8,257,157 | B2|   | 9/2012  | Polchin ............................. 463/9     |
| 8,287,372 | B2| * | 10/2012 | Hong ..................... A63F 13/02 463/32    |
| 8,585,497 | B2| * | 11/2013 | Borge ............................. 463/29      |
| 8,595,811 | B2| * | 11/2013 | Johnson et al. .................... 726/9       |
| 8,602,857 | B2|   | 12/2013 | Morichau-Beauchant et al. ................................. 463/6 |

(Continued)

OTHER PUBLICATIONS

U.S. Appl. No. 14/622,354, a non-Final Office Action, mailed Jun. 5, 2015, 12 pages.

(Continued)

*Primary Examiner* — Qing Chen
(74) *Attorney, Agent, or Firm* — Sheppard Mullin Richter & Hampton LLP

(57) ABSTRACT

In certain implementations, a software development kit to enable configuration of virtual counterparts of action figures or action figure accessories may be provided. As an example, the software development kit may enable a developer to associate a state or behavior of an action figure type with a virtual state or behavior of a corresponding virtual counterpart type in a virtual environment such that, when an action figure (of that type) exhibits the state or behavior, a corresponding virtual counterpart is caused to exhibit the virtual state or behavior in the virtual environment. The software development kit may, for example, enable the same state or behavior to be associated with different action figure types and/or different virtual states or behaviors such that, even when action figures of different action figure types exhibit the same state or behavior, their corresponding virtual counterparts may be caused to exhibit different virtual states or behaviors.

10 Claims, 8 Drawing Sheets

(56) References Cited

U.S. PATENT DOCUMENTS

| | | | |
|---|---|---|---|
| 8,636,588 B2 * | 1/2014 | Borge | 463/29 |
| 8,734,242 B2 * | 5/2014 | Borge | 463/29 |
| 8,858,339 B2 * | 10/2014 | Reiche | A63F 13/12 446/175 |
| 9,205,336 B1 | 12/2015 | Yano | |
| 9,259,651 B1 | 2/2016 | Yano | |
| 9,266,027 B1 | 2/2016 | Yano | |
| 2003/0027636 A1 | 2/2003 | Covannon et al. | 463/42 |
| 2005/0059483 A1 * | 3/2005 | Borge | 463/29 |
| 2005/0266920 A1 | 12/2005 | Kaku et al. | 463/31 |
| 2006/0070029 A1 * | 3/2006 | Laborczfalvi et al. | 717/120 |
| 2006/0084362 A1 | 4/2006 | Ghaly | 446/484 |
| 2006/0273909 A1 | 12/2006 | Heiman et al. | 340/572.7 |
| 2007/0015588 A1 * | 1/2007 | Matsumoto et al. | 463/43 |
| 2007/0197297 A1 | 8/2007 | Witchey | 463/42 |
| 2008/0081694 A1 * | 4/2008 | Hong | A63F 13/02 463/34 |
| 2009/0053970 A1 * | 2/2009 | Borge | 446/268 |
| 2009/0054155 A1 * | 2/2009 | Borge | 463/42 |
| 2009/0098792 A1 | 4/2009 | Cheng et al. | 446/219 |
| 2009/0158210 A1 | 6/2009 | Cheng et al. | 715/810 |
| 2010/0088650 A1 | 4/2010 | Kaltenbach et al. | 715/849 |
| 2010/0151940 A1 * | 6/2010 | Borge | 463/29 |
| 2011/0014984 A1 | 1/2011 | Penman et al. | 463/42 |
| 2011/0021109 A1 * | 1/2011 | Le | A63H 3/28 446/300 |
| 2011/0047600 A1 * | 2/2011 | Johnson et al. | 726/4 |
| 2011/0124264 A1 | 5/2011 | Garbos | 446/147 |
| 2012/0295703 A1 | 11/2012 | Reiche et al. | 463/31 |
| 2013/0288563 A1 | 10/2013 | Zheng et al. | 446/268 |
| 2013/0296058 A1 * | 11/2013 | Leyland | A63F 13/12 463/42 |
| 2013/0307848 A1 | 11/2013 | Tena et al. | 345/420 |
| 2014/0030955 A1 | 1/2014 | Smetanin et al. | 446/268 |
| 2014/0088750 A1 | 3/2014 | Sharma et al. | 700/118 |
| 2014/0114630 A1 | 4/2014 | Brave | 703/6 |
| 2014/0121008 A1 | 5/2014 | Canessa | 463/29 |
| 2014/0162785 A1 * | 6/2014 | Reiche | A63F 13/12 463/35 |
| 2014/0227676 A1 * | 8/2014 | Noshadi | G09B 5/02 434/365 |
| 2014/0273717 A1 | 9/2014 | Judkins et al. | 446/175 |
| 2014/0273721 A1 | 9/2014 | Katan et al. | 446/268 |
| 2014/0274313 A1 | 9/2014 | Bala | G06Q 30/06 463/25 |
| 2014/0357373 A1 * | 12/2014 | Barney et al. | 463/37 |
| 2015/0038229 A1 * | 2/2015 | Reiche | A63F 13/12 463/35 |
| 2015/0080121 A1 * | 3/2015 | Garlington | A63F 13/52 463/31 |
| 2015/0174479 A1 | 6/2015 | Reiche et al. | |

OTHER PUBLICATIONS

U.S. Appl. No. 14/622,287, a non-Final Office Action, mailed Jun. 24, 2015, 20 pages.

U.S. Appl. No. 14/622,386, a non-Final Office Action, mailed Jul. 6, 2015, 14 pages.

U.S. Appl. No. 14/622,321, a non-Final Office Action, mailed Jul. 24, 2015, 10 pages.

U.S. Appl. No. 14/636,115, a Notice of Allowance, mailed Oct. 7, 2015, 9 pages.

U.S. Appl. No. 14/622,386, a Notice of Allowance, mailed Nov. 30, 2015, 9 pages.

U.S. Appl. No. 14/622,354, a Notice of Allowance, mailed Dec. 22, 2015, 10 pages.

U.S. Appl. No. 14/622,321, a non-final Office Action, mailed Jan. 6, 2016, 12 pages.

U.S. Appl. No. 14/622,287, a Final Office Action, mailed Jan. 7, 2016, 18 pages.

U.S. Appl. No. 14/961,040, a non-final office Action, mailed Jan. 20, 2016, 23 pages.

* cited by examiner

SYSTEM AND METHOD FOR PROVIDING A SOFTWARE DEVELOPMENT KIT TO ENABLE CONFIGURATION OF VIRTUAL COUNTERPARTS OF ACTION FIGURES OR ACTION FIGURE ACCESSORIES

CROSS-REFERENCE TO RELATED APPLICATIONS

This application is related to following, co-pending U.S. utility patent applications, filed on Feb. 13, 2015: (1) U.S. patent application Ser. No. 14/622,287, entitled "SYSTEM AND METHOD FOR PRESENTING A VIRTUAL COUNTERPART OF AN ACTION FIGURE BASED ON ACTION FIGURE STATE INFORMATION," (2) U.S. patent application Ser. No. 14/622,321, entitled "SYSTEM AND METHOD FOR PROVIDING STATE INFORMATION OF AN ACTION FIGURE," (3) U.S. patent application Ser. No. 14/622,354, entitled "SYSTEM AND METHOD FOR PROVIDING AN ENHANCED MARKETING, SALE, OR ORDER FULFILLMENT EXPERIENCE RELATED TO ACTION FIGURES OR ACTION FIGURE ACCESSORIES HAVING CORRESPONDING VIRTUAL COUNTERPARTS," and (4) U.S. patent application Ser. No. 14/622,386, entitled "SYSTEM AND METHOD FOR PROVIDING RELEVANT NOTIFICATIONS VIA AN ACTION FIGURE," each of which is hereby incorporated by reference herein in its entirety.

This application is additionally related to U.S. application Ser. No. 14/636,115, filed on Mar. 2, 2015, entitled "SYSTEM AND METHOD FOR PROVIDING SECURED WIRELESS COMMUNICATION WITH AN ACTION FIGURE OR ACTION FIGURE ACCESSORY," which is hereby incorporated by reference herein in its entirety.

FIELD OF THE INVENTION

The invention relates to providing interactive action figures or action figure accessories that have corresponding virtual counterparts in a virtual environment, and more particularly to a system and method of providing a software development kit to enable configuration of virtual counterparts of action figures or action figure accessories.

BACKGROUND OF THE INVENTION

In recent years, a number of video game/toy hybrid systems have emerged where figurines of movie, comic, or story characters can "come to life" in a video game. As an example, typical video game/toy hybrid systems enable a player to "import" a character represented by a figurine into the video game by placing the figurine on a portal device attached to a game console. Each game session may require the player to import the character (via the placement of the figurine) to utilize the character to accomplish various tasks in the game during the session. From the perspective of the player, the figurine and the character may become "synonymous" with one another as the player continues to use the figurine to access the character in the video game. As the character grows in-game (e.g., levels up) and obtains new abilities and special powers, the value of the figurine to the player may also increase—further adding to the collectability value of the figurine.

Typical video game/toy hybrid systems are, however, limited with respect to the interactions between the player and the figurine. For example, during gameplay, figurines are used by a player to select one or more characters to use in a game by placing the figurines corresponding to the characters on a portal device. All other user interactions with the game generally do not involve the figurines. These and other drawbacks exist.

SUMMARY OF THE INVENTION

The invention addressing these and other drawbacks relates to methods, apparatuses, or systems for providing a software development kit to enable configuration of virtual counterparts of action figures or action figure accessories. As used herein, an action figure may comprise a figurine, made of plastic or other materials, having one or more moveable parts (e.g., moveable appendages or other moveable parts) that allow the action figure to exhibit various poses. An action figure accessory may comprise one or more physical objects that modify or supplement the functionality or appearance of an action figure (e.g., to make the action figure more useful, versatile, or attractive, to change the appearance of the action figure, etc.). A virtual environment may comprise a virtual space, a game space, a virtual universe, or other virtual environment. A host of the virtual environment may comprise one or more virtual universe servers, game servers, or other components that host the virtual environment.

In accordance with one aspect of the invention, a user may interact with a virtual environment or control a virtual counterpart of an action figure in the virtual environment by manipulating an action figure or its moveable parts, such as manipulating the positions and orientations of the action figure's moveable parts. As an example, sensors located on different parts of the action figure (e.g., sensors located on in the body and appendages of the action figure) may obtain sensor information that reflects the user manipulation of the action figure or its moveable parts. The sensor information may be utilized to generate action figure state or behavior information that identifies positions and orientations of the action figure's moveable parts relative to other parts of the action figure, a movement of the action figure's moveable parts relative to other parts of the action figure, or other state or behaviors. The action figure state or behavior information may then be utilized to cause the action figure's virtual counterpart to exhibit a virtual state or behavior in the virtual environment. A presentation of the virtual counterpart exhibiting the virtual state or behavior in the virtual environment may be generated and provided to a user of the virtual environment. In this way, the user may interact with the virtual environment or control the virtual counterpart by interacting with the action figure in the real-world environment.

In an implementation, one or more software development kits may be provided to enable developers to integrate communications functionality between action figures, action figure accessories, user devices (and its respective applications), a host of a virtual environment, or other components as described, for instance, in co-pending U.S. utility patent applications, such as (1) U.S. patent application Ser. No. 14/622,287, entitled "SYSTEM AND METHOD FOR PRESENTING A VIRTUAL COUNTERPART OF AN ACTION FIGURE BASED ON ACTION FIGURE STATE INFORMATION," (2) U.S. patent application Ser. No. 14/622,321, entitled "SYSTEM AND METHOD FOR PROVIDING STATE INFORMATION OF AN ACTION FIGURE," and (3) U.S. patent application Ser. No. 14/622,386, entitled "SYSTEM AND METHOD FOR PROVIDING RELEVANT NOTIFICATIONS VIA AN ACTION FIGURE," each of which is hereby incorporated by reference herein in its entirety. As an example, a software development kit may enable a host of a virtual environment (or other components)

to send notifications to an action figure or accessory to cause the action figure or accessory to present information related to the notifications. In one use case, for example, the virtual environment host may send a sound file to an action figure to cause the action figure to play the sound file via the action figure's built-in speaker to emulate (via the action figure) sounds or other aspects occurring in the virtual environment (e.g., actions of a virtual counterpart of the action figure, things "heard" by the virtual counterpart, etc., such as firing of weapons, virtual environment weather sounds, etc.). As another example, the software development kit may enable synchronization of lights (e.g., LED lights) of the action figure with corresponding parts of the action figure's virtual counterpart in the virtual environment (e.g., when the corresponding parts of the virtual counterpart emit lights in the virtual environment, the lights of the action figure may activate such that they emulate the lights emitted by the virtual counterpart). In one scenario, for instance, the virtual counterpart may flash lights on its body from time to time to indicate certain statuses (e.g., when its health points, energy, etc., are low). Based on the synchronization, the corresponding lights on the action figure's body may activate to emulate the flashing lights on the virtual counterpart's body. As yet another example, the software development kit may enable game or other statuses to be transmitted to the action figure to cause the action figure to present the status at the action figure. As described in the foregoing co-pending applications, the presentation of information (e.g., an auditory presentation, a visual presentation, a haptic presentation, or other presentation) at an action figure or accessory may be triggered by the virtual environment host, via user interactions with the action figure or accessory (e.g., a multi-function button on the action figure or accessory), or via other techniques.

In an implementation, one or more software development kits may be provided to facilitate detection of another component, establishment/maintenance of a wireless connection with the other component, or communication over the wireless connection. As an example, a software development kit may enable a developer (or other user) to define a maximum threshold distance for communication between two components (e.g., between an action figure and a user device). Responsive to the maximum threshold distance being defined, information sent from the sending component (e.g., an action figure) to the receiving component (e.g., the user device) may be ignored (e.g., filtered out) by the receiving component when the distance between the two components is beyond the maximum threshold distance. As another example, a software development kit may enable a developer (or other user) to set the output power of wireless signals (e.g., by setting the output voltage of wireless signals) for one or more components (e.g., a user device, an action figure, an action figure accessory, etc.). In one use case, for instance, a developer may set the output voltage of wireless signals emitted by a user device, an action figure, an action figure accessory, or other component to a low output voltage, which may limit the distance that the wireless signals can travel, but may extend the battery life of the component.

In an implementation, one or more software development kits may be provided to facilitate validation of action figures, action figure accessories, or other items by a secure means. As an example, a software development kit may enable access to a communication portal to a central validation server (or other components) that validates the action figures, the action figure accessories, or other items via one or more secure means described, for instance, in related co-pending U.S. application Ser. No. 14/636,115, entitled "SYSTEM AND METHOD FOR PROVIDING SECURED WIRELESS COMMUNICATION WITH AN ACTION FIGURE OR ACTION FIGURE ACCESSORY," which is hereby incorporated by reference in its entirety.

In an implementation, a software development kit may be provided to enable developers (or other users) to customize control of virtual counterparts of action figures in one or more virtual environments. The virtual counterparts may, for example, be customized such that virtual counterparts (of action figures of different action figure types) may react differently in a virtual environment in response to their respective corresponding action figures exhibiting the same states or behaviors (e.g., poses, movements, etc.). A given action figure type may, for example, comprise action figures that represent a given species or breed of character entities, action figures that represent a given character entity, etc. As an example, based on the customized control, a first virtual counterpart of a first action figure (of a first action figure type) may be caused to exhibit a first virtual action (e.g., a fireball attack) in a virtual environment responsive to the first action figure exhibiting a particular movement (e.g., rotating both arms of the first action figure 90 degrees in a down to forward motion). On the other hand, a second virtual counterpart of a second action figure (of a second action figure type) may be caused to exhibit a second virtual action (e.g., rapid series of punches) in the virtual environment responsive to the second action figure exhibiting the same movement.

It should be noted that, although implementations described herein are with respect to action figures and action figure accessories, it is understood that (to the extent possible) other objects may be used in place of action figures and/or action figure accessories. As an example, in an implementation, state or behavior information identifying a virtual state or behavior of a real-world object may be utilized to cause a corresponding virtual object to exhibit a state or behavior in a virtual environment that corresponds to the identified state or behavior of the real-world object. Additionally, or alternatively, a presentation of the corresponding virtual object exhibiting the corresponding state or behavior in the virtual environment may be provided to a user of the virtual environment.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a", "an", and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the implementations of the invention. It will be appreciated, however, by those having skill in the art that the implementations of the invention may be practiced without these specific details or with an equivalent arrangement. In other instances, well-known structures and devices are shown in block diagram form in order to avoid unnecessarily obscuring the implementations of the invention.

Exemplary System Description

Figure 1:
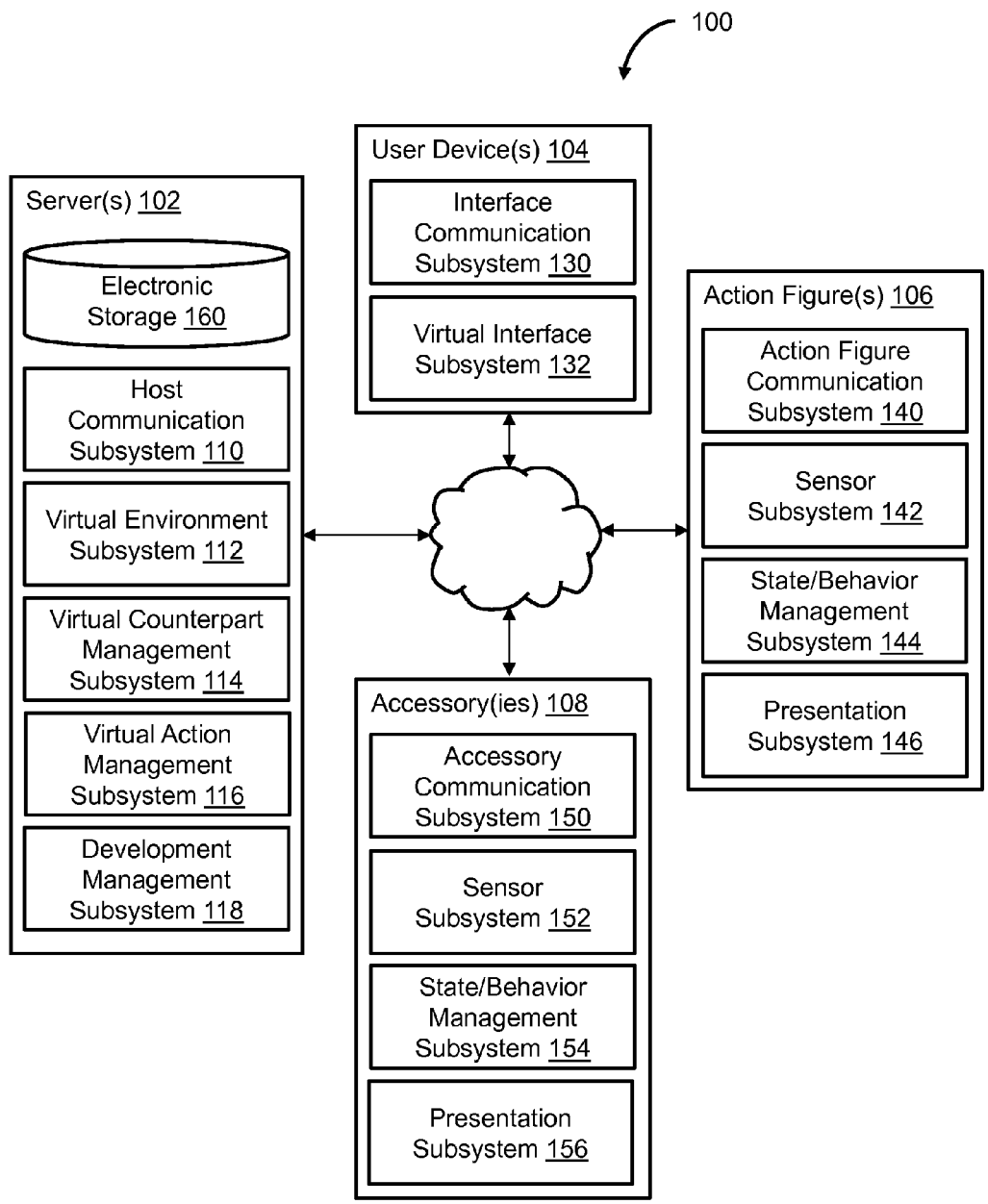
FIG. 1 is an exemplary illustration of a system for providing a software development kit to enable configuration of virtual counterparts of action figures or action figure accessories, in accordance with an aspect of the invention.

FIG. 1 is an exemplary illustration of a system 100 for providing a software development kit to enable configuration of virtual counterparts of action figures or action figure accessories, in accordance with an aspect of the invention. As shown in FIG. 1, system 100 may comprise server 102 (or multiple servers 102). Server 102 may comprise host communication subsystem 110, virtual environment subsystem 112, virtual counterpart management subsystem 114, virtual action management subsystem 116, development management subsystem 118, or other components.

System 100 may further comprise a user device 104 (or multiple user devices 104). User device 104 may comprise any type of mobile terminal, fixed terminal, or other device. By way of example, user device 104 may comprise a desktop computer, a notebook computer, a netbook computer, a tablet computer, a smartphone, a navigation device, an electronic book device, a gaming device, or other user device. Users may, for instance, utilize one or more user devices 104 to interact with server 102, other user devices 104, action figures 106, action figure accessories 108, or other components of system 100.

User device 104 may comprise interface communication subsystem 130, virtual interface subsystem 132, or other components. It should be noted that, while one or more operations are described herein as being performed by components of one of server 102 or user device 104, those operations may, in some implementations, be performed by components of the other one of service 102 or user device 104.

Action figure 106 may comprise action figure communication subsystem 140, sensor subsystem 142, state/behavior management subsystem 144, presentation subsystem 146, or other components. Action figure accessory 108 may comprise accessory communication subsystem 150, sensor subsystem 152, state/behavior management subsystem 154, presentation subsystem 156, or other components. It should be noted that, while one or more operations are described herein as being performed by components of one of action figure 106 or action figure accessory 108, those operations may, in some implementations, be performed by components of the other one of action figure 106 or action figure accessory 108.

In some implementations, user device 104 may act as an intermediary between server 102, action figure 106, and/or accessory 108. As an example, information may be provided from server 102 to action figure 106 or accessory 108 via virtual interface subsystem 132 of user device 104, and information may be provided from action figure 106 or accessory 108 to server 102 via virtual interface subsystem 132 of user device 104. In other implementations, server 102, action figure 106, and/or accessory 108 may receive information from or transmit information to one another without the need for user device 104 through one or more wired or wireless means. As such, although some implementations are described herein with respect to the use of user device 104 (or virtual interface subsystem 132) as an intermediary between server 102, action figure 106, and/or accessory 108, it is understood that (to the extent possible) receipt and transmission of information between server 102, action figure 106, and/or accessory 108 may be performed without the need for user device 104 as an intermediary.

In some implementations, the various computers and subsystems illustrated in FIG. 1 may comprise one or more computing devices that are programmed to perform the functions described herein. The computing devices may include one or more electronic storages (e.g., electronic storage 160, or other electric storages), one or more physical processors programmed with one or more computer program instructions, and/or other components. The computing devices may include communication lines, or ports to enable the exchange of information with a network or other computing platforms. The computing devices may include a plurality of hardware, software, and/or firmware components operating together to provide the functionality attributed herein to the servers. For example, the computing devices may be implemented by a cloud of computing platforms operating together as the computing devices.

The electronic storages may comprise non-transitory storage media that electronically stores information. The electronic storage media of the electronic storages may include one or both of system storage that is provided integrally (e.g., substantially non-removable) with the servers or removable storage that is removably connectable to the servers via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information received from the servers, information received from client computing platforms, or other information that enables the servers to function as described herein.

The processors may be programmed to provide information processing capabilities in the servers. As such, the processors may include one or more of a digital processor, an analog processor, a digital circuit designed to process information, an analog circuit designed to process information, a state machine, and/or other mechanisms for electronically processing information. In some implementations, the processors may include a plurality of processing units. These processing units may be physically located within the same device, or the processors may represent processing functionality of a plurality of devices operating in coordination. The processors may be programmed to execute computer program instructions to perform functions described herein of subsystems 110-156 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 110-156 described herein is for illustrative purposes, and is not intended to be limiting, as any of subsystems 110-156 may provide more or less functionality than is described. For example, one or more of subsystems 110-156 may be eliminated, and some or all of its functionality may be provided by other ones of subsystems 110-156. As another example, additional subsystems may be programmed to perform some or all of the functionality attributed herein to one of subsystems 110-156.

Attention will now be turned to a more detailed description of various implementations comprising one or more features related to providing interactive action figures and/or action figure accessories that have corresponding virtual counterparts in a virtual environment. It should be noted that features described herein may be implemented separately or in combination with one another.

Presentation of Virtual Counterparts Based on Action Figure State/Behavior

In an implementation, action figure state or behavior information obtained from an action figure may be utilized to cause a virtual counterpart of the action figure to exhibit a state or behavior (or a "virtual state or behavior") that corresponds to a state or behavior of the action figure. A presentation of the virtual counterpart of the action figure exhibiting the corresponding state or behavior in a virtual environment may be provided to a user of the virtual environment. In some implementations, state or behavior information identifying states or behaviors of multiple action figures or accessories may be obtained from one or more of the action figures or accessories. The state or behavior information may then be utilized to cause virtual counterparts of the action figures or accessories to exhibit virtual states or behaviors that correspond to states or behaviors of the action figures or accessories. The virtual counterparts may then be presented exhibiting the corresponding virtual states (e.g., certain poses, health levels, attack powers, defense strengths, physical characteristics, or other states) or behaviors (e.g., actions or other behaviors).

In an implementation, interface communication subsystem 130 may detect action figure 106 within a short wireless communication range of user device 104. Based on the detection of action figure 106, interface communication subsystem 130 may establish a wireless connection between user device 104 and action figure 106. Additionally, or alternatively, interface communication subsystem 130 may detect one or more accessories 108, other action figures 106, or other objects within a short wireless communication range of user device 104, and establish respective wireless connections with the detected objects.

As an example, if interface communication subsystem 130 enables wireless communication between user device 104 and the other object (e.g., action figure 106, accessory 108, etc.) via NFC technology, the other object may need to be within an NFC communication range in order for the other object to be detected and an NFC communication session to be established between user device 104 and the other object. As another example, if interface communication subsystem 130 enables wireless communication between user device 104 and the other object via Bluetooth technology, the other object may need to be within a Bluetooth communication range in order for the other object to be detected and a Bluetooth communication session to be established between user device 104 and the other object. As yet another example, if interface communication subsystem 130 enables wireless communication between user device 104 and the other object via Wi-Fi technology, the other object may need to be within a Wi-Fi communication range in order for the other object to be detected and a Wi-Fi communication session to be established between user device 104 and the other object.

Figure 2A:
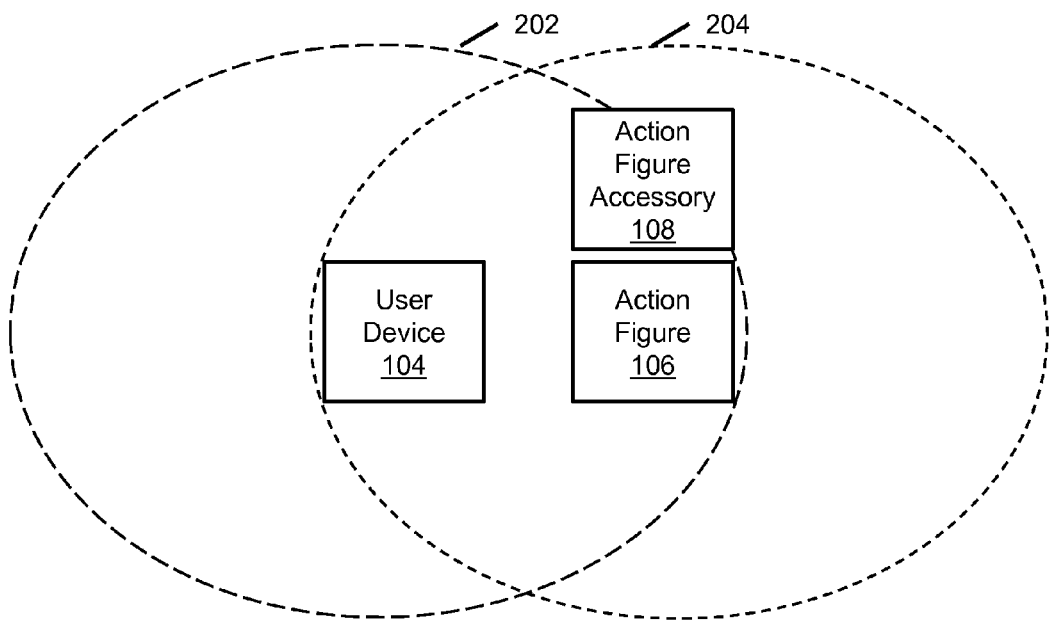
FIGS. 2A and 2B are exemplary illustrations of scenarios in which user devices, action figures, or action figure accessories communicate with one another via a short-range wireless connection, in accordance with aspects of the invention.

In one scenario, as shown in FIG. 2A, objects within area 202 may be within a wireless communication range of user device 104, and objects within area 204 may be within a wireless communication range of action figure 106. In the scenario of FIG. 2A, user device 104 and action figure 106 may establish a wireless connection with one another through which the two devices may directly communicate with one another. Additionally, or alternatively, user device 104 and accessory 108 may establish a wireless connection with one another through which the two devices may directly communicate with one another.

In another scenario, accessory 108 may provide information to user device 104 (or to a host of an associated virtual environment) by transmitting the information to action figure 106 via a wireless connection established between action figure 106 and accessory 108. Upon receipt of the information, action figure 106 may transmit the information to user device 104 via a wireless connection established between user device 104 and action figure 106. Accessory 108 may also receive information from user device 104 through action figure 106. In yet another other scenario, the roles of action figure 106 and accessory 108 may be swapped such that user device 104 and accessory 108 may be within each other's respective wireless communication ranges, and accessory 108 may relay information from action figure 106 to user device 104 or from user device 104 to action figure 106.

In yet another scenario, one or more action figures 106 may act as intermediaries between (i) one or more other action figures 106 (or their accessories 108) and (ii) user device 104 (or a host of an associated virtual environment). As an example, user device 104 may not support enough wireless connections at a given time. As such, one or more action figures 106 may act as intermediaries to limit the number of wireless connections with user device 104. If, for example, an "army" of action figures 106 is used during gameplay, one or more action figures 106 may act as intermediaries and establish wireless connections with user device 104 and other action figures 106. Thus, the receipt and transmission to/from the other action figures 106 may be performed through the intermediary action figures 106.

Figure 2B:
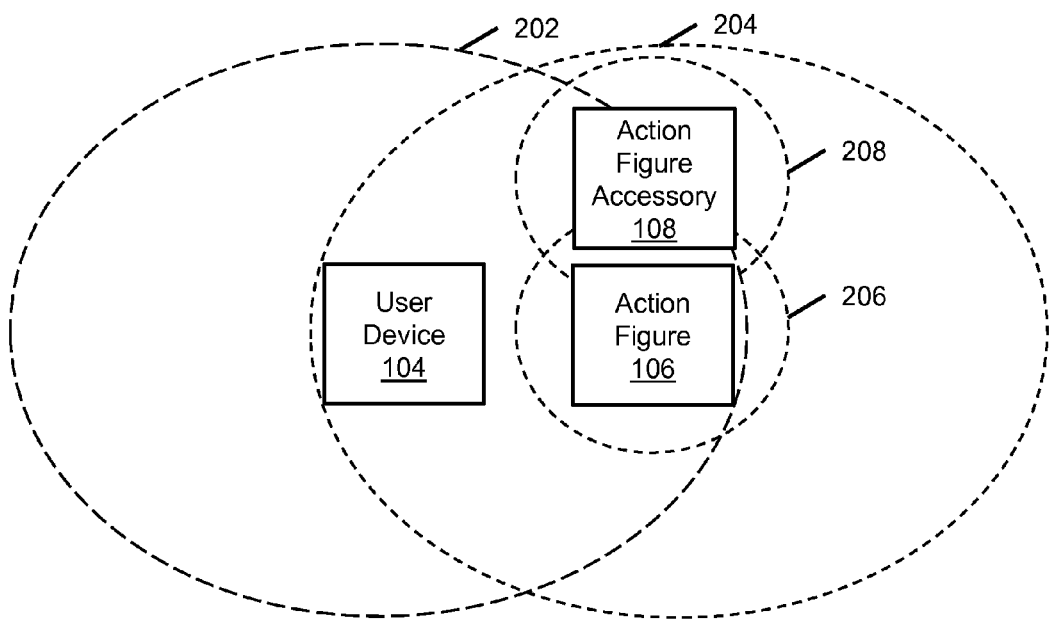

In a further scenario, with respect to FIG. 2B, area 202 may correspond to a Bluetooth communication range of user device 104, and area 204 may correspond to a Bluetooth communication range of action figure 106. Area 206 may correspond to an NFC communication range of action figure 106, and area 208 may correspond to an NFC communication range of accessory 108. As an example, user device 104 and action figure 106 may establish a Bluetooth communication session with one another through which the two devices may directly communicate with one another. Action figure 106 and accessory 108 may establish an NFC communication session with one another through which the two devices may directly communicate with one another.

In an implementation, specific wireless communication ranges of user devices, action figures, action figure accessories, or other components may be defined (e.g., customized by developers via a software development kit for the components). A defined wireless communication range of a component may, for example, be different from the wireless communication range at which the component is capable of sending or receiving information from other components. In one scenario, two Bluetooth-enabled devices may be capable of sending and receiving information to/from one another when they are at most 24 inches (or other distance) from one another based on their output signal power settings. Nevertheless, wireless communication ranges may be defined for one or more of the devices so that the defined ranges (e.g., at most 12 inches) are less than the ranges at which the devices are capable of sending and receiving information to/from one another.

As an example, when information is received from another component (e.g., action figure 106, accessory 108, etc.) attempting to communicate with user device 104, interface communication subsystem 130 may determine the distance of the other component from user device 104 and a maximum threshold distance that is defined for wireless communication with user device 104. Interface communication subsystem 140 may then compare the distance of the other component and the maximum threshold distance to determine whether to perform further processing on the received information. In one use case, responsive to a determination that the other component is no more the maximum threshold distance from user device 104, interface communication subsystem 130 may further process the information to identify the component, establish a wireless communication session with the component, or perform other operations based on the information. On the other hand, responsive to a determination that the other component is greater than the maximum threshold distance from user device 104, interface communication subsystem 130 may ignore the received information and perform no further processing of the received information.

As an example, when information is received from another component (e.g., user device 104) attempting to communicate with action figure 106, action figure communication subsystem 140 may determine the distance of the other component from action figure 106 and a maximum threshold distance that is defined for wireless communication with action figure 106. Action figure communication subsystem 140 may then compare the distance of the other component and the maximum threshold distance to determine whether to perform further processing on the received information (e.g., perform further processing if the other component is no more than the maximum threshold distance from action figure 106, ignore the received information if the other component is greater than the maximum threshold distance from action figure 106, etc.).

In an implementation, the output power of wireless signals for one or more components (e.g., a user device, an action figure, an action figure accessory, etc.) may be set to a default value (e.g., based on technology) or to a customized value. As an example, a software development kit may enable a developer to set the output voltage of wireless signals emitted by a user device, an action figure, an action figure accessory, or other component to a low output voltage, which may limit the distance that the wireless signals can travel, but may extend the battery life of the component. As another example, the software development kit may enable the developer to increase the output voltage of the wireless signals of the component to increase the distance that the wireless signals can travel.

It should be noted that, although some implementations described herein are with respect to wireless communications between one or more components of system 100, it is understood that (to the extent possible) communications between the components of system 100 may be performed via one or more wired means. For example, server 102, user device 104, action figure 106, accessory 108, or other components of system 100 may be directly connected to one another via a Universal Serial Bus (USB) connection, an Ethernet connection, or other wired means.

In an implementation, after a wireless connection between user device 104 and action figure 106 is established, virtual interface subsystem 132 may receive action figure state or behavior information from action figure 106 via the established wireless connection. The received action figure state or behavior information may, for example, comprise information identifying a state or behavior of action figure 106, a state or behavior of accessory 108 of action figure 106, a state or behavior of one or more other action figures or their respective accessories 108, or other state or behavior. As described herein elsewhere, the action figure state or behavior information may be generated (or otherwise obtained) by action figure 106 based on (i) sensor information obtained via one or more sensors of action figure 106, (ii) state or behavior information related to virtual counterparts, (iii) information from accessories 108, (iv) information from other action figures 106, or (v) other information.

Virtual interface subsystem 132 may provide the action figure state or behavior information to virtual environment subsystem 112. Based on the action figure state or behavior information, virtual environment subsystem 112 may work with virtual counterpart subsystem 114 or virtual action management subsystem 116 to cause one or more virtual counterparts of action figure 106, the other action figures 106, or their respective accessories 108 to exhibit one or more corresponding states or behaviors in a virtual environment. Additionally, or alternatively, virtual environment subsystem 112 may cause the virtual environment to exhibit one or more aspects based on the action figure state or behavior information. A presentation of the virtual counterparts in the virtual environment may be generated and provided to virtual interface subsystem 132. Responsive to receiving the presentation, virtual interface subsystem 132 may provide the presentation of the virtual counterparts and the virtual environment to a user of user device 104 (e.g., via a display electronically coupled to user device 104, via a speaker electronically coupled to user device 104, or other output device).

In an implementation, virtual interface subsystem 132 may receive action figure state information identifying a pose of action figure 106 (e.g., from action figure 106 via a wireless connection established between user device 104 and action figure 106). The state information may, for example, comprise a pose identifier (e.g., which can be used to retrieve information to cause a virtual counterpart of action figure 106 to exhibit a corresponding pose), a position of a moveable part of action figure 106 relative to another part of action figure 106, an orientation of the moveable part of action figure 106 relative to another part of action figure 106, or other aspects related to the pose of action figure 106. Moveable parts of an action figure may comprise the head (or heads), arms, legs, tails, other moveable appendages of the action figure, or other moveable parts.

Virtual interface 132 may provide the state information (identifying the pose of action figure 106) to virtual environment subsystem 112. Responsive to providing the state information, virtual interface subsystem 132 may obtain (from virtual environment subsystem 112) a presentation of a virtual counterpart of action figure 106 in a virtual environment exhibiting a virtual state or behavior (e.g., exhibiting a pose that reflects the pose of action figure 106, performing a virtual action associated with the pose of action figure 106, etc.). Virtual interface subsystem 132 may then provide the presentation of the virtual counterpart and the virtual environment to the user.

As an example, upon receipt of the state information, virtual environment subsystem 112 may cause the virtual counterpart to exhibit a pose in the virtual environment that reflects the relative positions and orientations of the moveable parts of action figure 106. The state information may identify the relative positions and orientations of the moveable parts of action figure 106. Based on the relative positions and orientations, one or more corresponding positions and orientations of the moveable parts of the virtual counterpart may be determined. The moveable parts of the virtual counterpart may then be moved into the corresponding positions and orientations so that the virtual counterpart exhibits a pose that reflects the relative positions and orientations of the moveable parts of action figure 106. In one scenario, for example, the head, arms, legs, or other moveable parts of the virtual counterpart may be caused to exhibit relative positions and orientations that correspond to the relative positions and orientations of the head, arms, legs, or other moveable parts of action figure 106, respectively (e.g., same or similar relative positions and orientations).

Figure 3A:
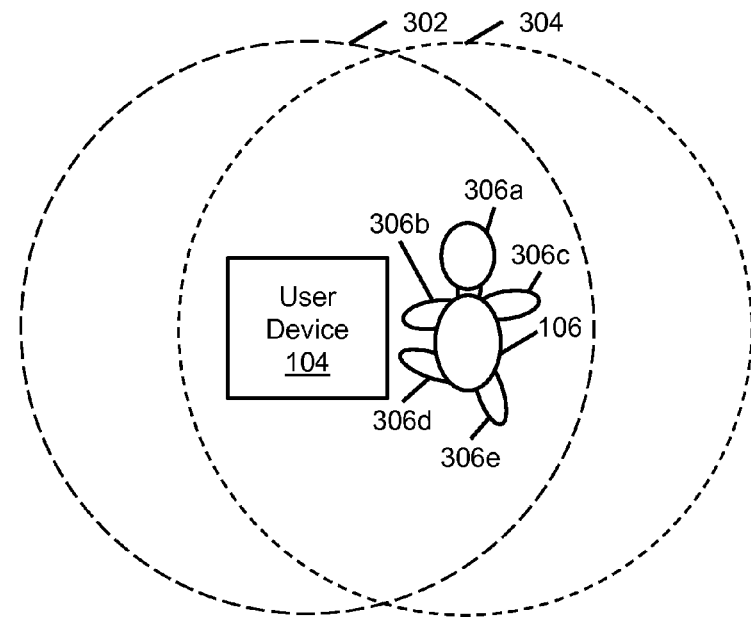
FIGS. 3A and 3B are exemplary illustrations of an action figure exhibiting a state or behavior, and a virtual counterpart of the action figure exhibiting a corresponding state or behavior in a virtual environment, respectively, in accordance with aspects of the invention.
Figure 3B:
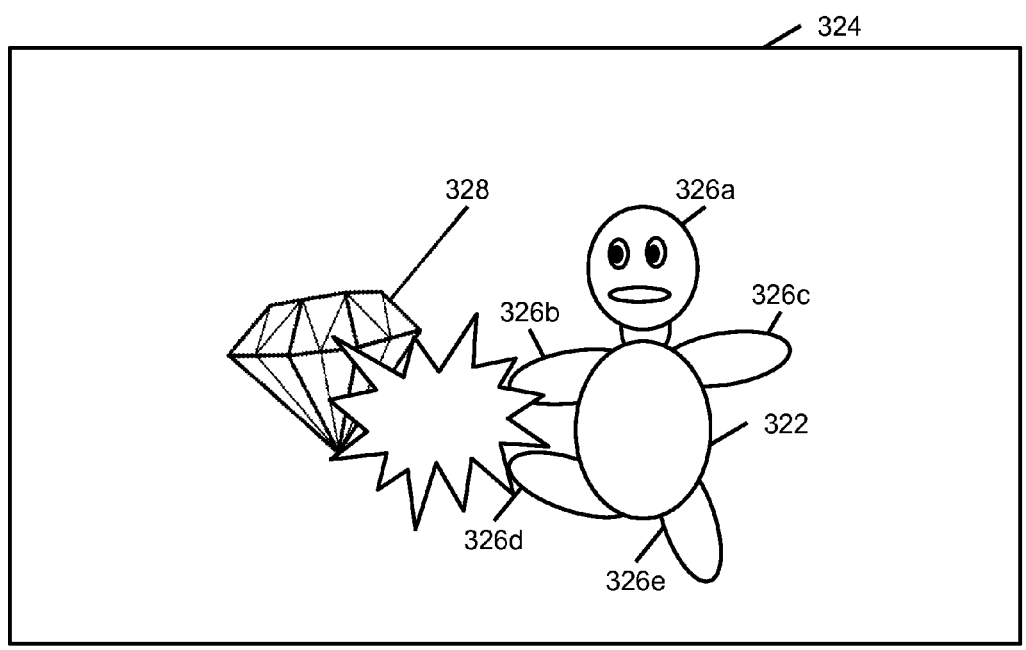

In one use case, with respect to FIGS. 3A and 3B, action figure 106 and user device 104 may establish a wireless connection with one another upon detecting each other in their respective wireless communication ranges. As shown in FIG. 3A, action figure 106 may be in a pose where its arms 306b and 306c are extended and its leg 306d is extended sideways to appear as if action figure 106 is executing a kick. For example, a user may interact with action figure 106 by positioning and orienting moveable parts 306a-306e of action figure 106 to cause action figure 106 to be in the particular pose. Action figure 106 may determine that it is currently exhibiting the pose (e.g., based on sensor information obtained via its sensors), and generate state information identifying the pose. The state information may then be transmitted to user device 104 via the established wireless connection. User device 104 may transmit the state information to a host of a virtual environment in which a virtual counterpart 322 of action figure 106 exists.

In another use case, upon receipt of the state information, a host of the virtual environment may cause virtual counterpart 322 to exhibit a pose that reflects the pose of action figure 106. As indicated in FIG. 3B, a presentation 324 of virtual counterpart 322 exhibiting the same pose as action figure 106 may be provided. For example, virtual counterpart 322 may be presented in a pose where its arms 326b and 326c are extended and its leg 326d is extended sideways to appear as if virtual counterpart 322 is executing a kick, which is the same pose exhibited by action figure 106.

As another example, upon receipt of the state information (identifying the pose of action figure 106), virtual environment subsystem 112 may work with virtual counterpart management subsystem 114 and/or virtual action management subsystem 116 to cause the virtual counterpart of action figure 106 to exhibit a virtual action associated with the identified pose in the virtual environment. In one use case, with respect to FIG. 3B, the state information may comprise an identifier of action figure 106, information identifying the pose of action figure 106, or other information. Virtual counterpart management subsystem 114 may utilize the identifier to identify virtual counterpart 322 as the virtual counterpart corresponding to action figure 106. Virtual action management subsystem 116 may utilize the information identifying the pose to identify a kicking action as the virtual action associated with the identified pose (e.g., by querying a virtual action database using the information identifying the pose). Based on the identification of virtual counterpart 322 and the kicking action, virtual environment subsystem 122 may cause virtual counterpart 322 to perform the kicking action in the virtual environment.

In an implementation, virtual interface subsystem 132 may receive action figure behavior information identifying a behavior of action figure 106, and provide the behavior information to virtual environment subsystem 112 for further processing. As an example, the behavior information may identify one or more movements exhibited by one or more moveable parts of action figure 106. Based on a processing of the behavior information, virtual environment subsystem 112 may work with virtual counterpart management subsystem 144 and/or virtual action management subsystem 116 to determine one or more virtual actions (e.g., a fireball attack or other action) that correspond to the identified movements. Virtual environment subsystem 112 may then cause the virtual counterpart to execute the corresponding actions in a virtual environment. A presentation of the virtual counterpart exhibiting the corresponding actions and the virtual environment may be provided to a user of user device 104.

In one scenario, with respect to FIGS. 3A and 3B, a user may quickly move leg 306d of action figure 106 upward about 90 degrees. Virtual environment subsystem 112 may receive, from action figure 106, behavior information identifying this upward 90 degree rotation of leg 306d. Based on the behavior information, virtual action management subsystem 116 may determine an action corresponding to the upward 90 degree leg rotation that is to be executed by virtual counterpart 322. The corresponding action may, for example, comprise a kicking action executable by virtual counterpart 322. As shown, virtual counterpart 322 may execute the kicking action on a virtual object (e.g., a hidden treasure chest) to unveil a hidden virtual object 328 (e.g., a diamond).

In an implementation, a set of predefined virtual actions that can be executed by one or more virtual counterparts may be stored in a database. As an example, the predefined virtual actions may be stored in association with one or more states or behaviors of action figures (e.g., poses of the action figures, movements of the action figures, etc.). When a state or behavior of an action figure is determined, the state or behavior may be utilized as input to query the database to determine at least one predefined virtual action associated with the state or behavior. A virtual counterpart of the action figure may then be caused to execute the predefined virtual action in the virtual environment.

Generation/Obtainment of Action Figure State/Behavior Information

In an implementation, action figure state or behavior information may be generated (or otherwise obtained) by an action figure based on sensor information obtained via one or more sensors of the action figure (or other information). The action figure state or behavior information may then be provided to a device via a wireless connection established between the action figure and the device so that the action figure state or behavior information may be utilized to cause a virtual counterpart of the action figure to exhibit a virtual state or behavior in a virtual environment that corresponds to a state or behavior of the action figure. In some implementations, state or behavior information related to an action figure accessory may be generated (or otherwise obtained) by the accessory based on sensor information obtained via one or more sensors of the accessory (or other information). The accessory state or behavior information may be provided to: (i) an action figure (e.g., with which the accessory is associated) via a wireless connection established between the accessory and the action figure; or (ii) one or more other devices via one or more wireless connections between the accessory and the other devices, respectively.

In an implementation, action figure communication subsystem 140 may detect a device (e.g., user device 104 or other device) within a short wireless communication range of action figure 106. Based on the detection of the device, action figure communication subsystem 140 may establish a wireless connection between action figure 106 and the device. As an example, action figure communication subsystem 140 may detect one or more user devices 104, other action figures 106, accessories 108, or other objects within a short wireless communication range of action figure 106, and establish respective wireless connections with the detected objects. After establishing the respective wireless connections, action figure 106 and the detected objects may communicate with one another via their respective wireless connections.

In an implementation, sensor subsystem 142 may obtain sensor information via one or more sensors of action figure 106. The sensors of action figure 106 may comprise one or more of magnetic field sensors, accelerometers, gyroscopes, proximity sensors, GPS sensors, impact sensors, water sensors, temperature sensors, cameras, or other sensors. As an example, acceleration force data for each of the three coordinate axes may be obtained from one or more accelerometers. Magnetic field data may be obtained from one or more magnetic field sensors. Rate of rotation data for the three coordinate axes may be obtained from one or more gyroscopes. The acceleration force data and the magnetic field data may be utilized to determine one or more positions, orientations, etc., of action figure 106 or parts of action figure 106 (e.g., body, moveable appendixes, etc., depending on the locations of the respective sensors) relative to one another, the magnetic North pole, or other point of reference. The acceleration force data and the rate of rotation data may be utilized to determine one or more forward/back motions, up/down motions, left/right motions, pitch motions, yaw motions, roll motions, etc., of action figure 106 or parts of action figure 106.

As another example, depth/distance information with respect to a distance of action figure 106 (or parts thereof) from one or more other objects may be obtained from one or more depth sensing cameras. As another example, wireless signal strength information with regard to one or more signals from one or more other action figures 106, accessories 108, user devices 104, or other wireless objects may be obtained from wireless objects (e.g., Bluetooth, NFC, Wi-Fi, etc.) of action figure 106. The wireless strength information or other information (GPS data, depth/distance information from depth sensing cameras, etc.) may be utilized to determine a distance of the other wireless objects relative to action figure 106 (or parts thereof), a position/location of action figure 106 or the other wireless objects, or other information.

Figure 4A:
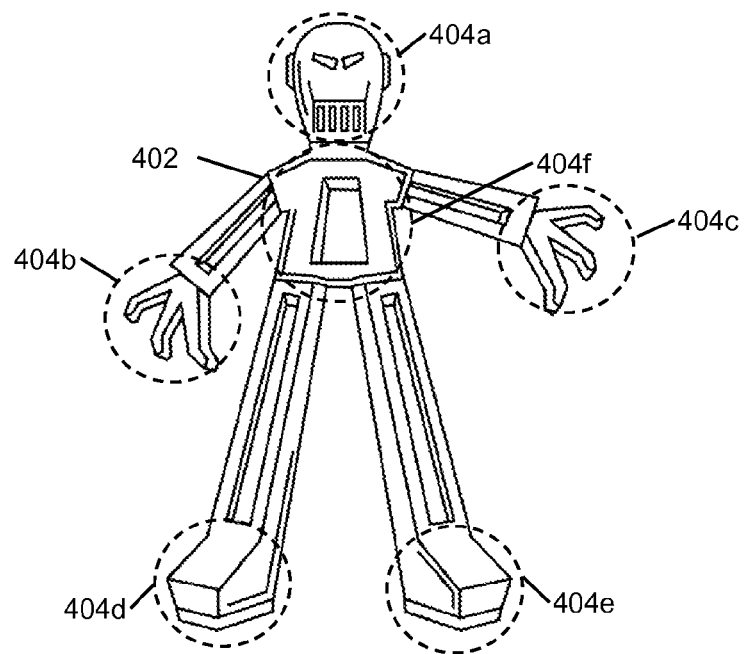
FIGS. 4A and 4B are exemplary illustrations of an action figure and the action figure equipped with action figure accessories, respectively, in accordance with aspects of the invention.

In one use case, with respect to FIG. 4A, action figure 402 may be equipped with a set of sensors in one or more of the areas 404a-404f located on at the head, the arms/hands, the legs/feet, and the body, respectively. As an example, each area 404a-404f may comprise a magnetic field sensor, an accelerometer, a gyroscope, or other sensor. Sensor information obtained from sensors in one area 404 may be compared with sensor information obtained from sensors in one or more other areas 404 to determine (i) a position or orientation of one area 404 relative to one or more other areas 404, (ii) a movement of one area 404 relative to one or more other areas 404, or (iii) other information.

Figure 4B:
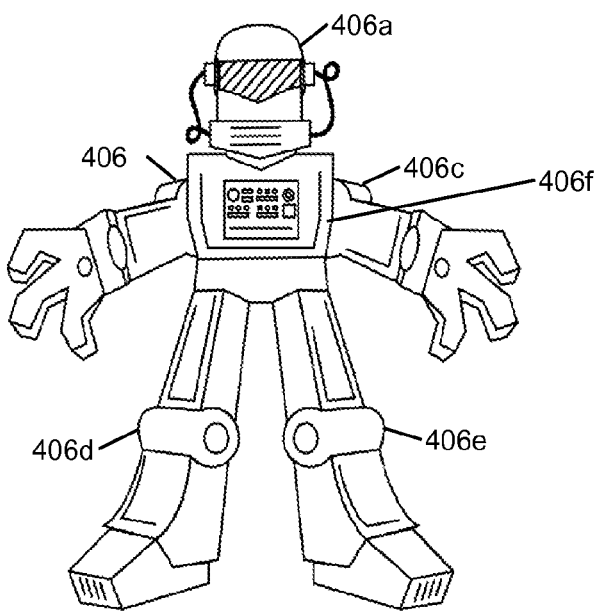

Additionally, or alternatively, with respect to FIG. 4B, one or more accessories 406a-406f may be equipped with sensors, and action figure 402 may wireless obtain sensor information from each of the accessories 406a-406f that are equipped with sensors. Because the accessories 406a-406f are designed to be attached to the head, arms/hands, legs/feet, and body, respectively, sensor information obtain from the accessories may be utilized to determine (i) positions or orientations of one part of action figure 106 relative to another part of action figure 106, (ii) a movement of one part of action figure 106 relative to another part of action figure 106, or (iii) or other information.

In an implementation, state/behavior management subsystem 144 may generate action figure state or behavior information based on sensor information obtained via one or more sensors of action figure 106 (or other information). As an example, state/behavior management subsystem 144 may determine a pose of action figure 106 (e.g., relative positions and orientations of moveable parts of action figure 106) based on the sensor information (e.g., from one or more accelerometers, magnetic field sensors, cameras, or other sensors), and generate state information identifying the pose of action figure 106. As another example, state/behavior management subsystem 144 may determine one or more movements performed by one or more moveable parts of action figure 106 based on the sensor information (e.g., from one or more accelerometers, gyroscopes, cameras, or other sensors), and generate behavior information identifying the movements of the moveable parts of action figure 106.

After generating the action figure state or behavior information, state/behavior management subsystem 144 may provide the action figure state or behavior information to virtual interface subsystem 132 via a wireless connection between action figure 106 and user device 104 (or to other components via one or more wireless connections between action figure 106 and a device hosting the other components, respectively). Virtual environment subsystem 112 may obtain the action figure state or behavior information from virtual interface subsystem 132, and utilize the action figure state or behavior information to cause a virtual counterpart of action figure 106 to exhibit a state or behavior in a virtual environment that corresponds to a state or behavior of action figure 106.

Figure 5:
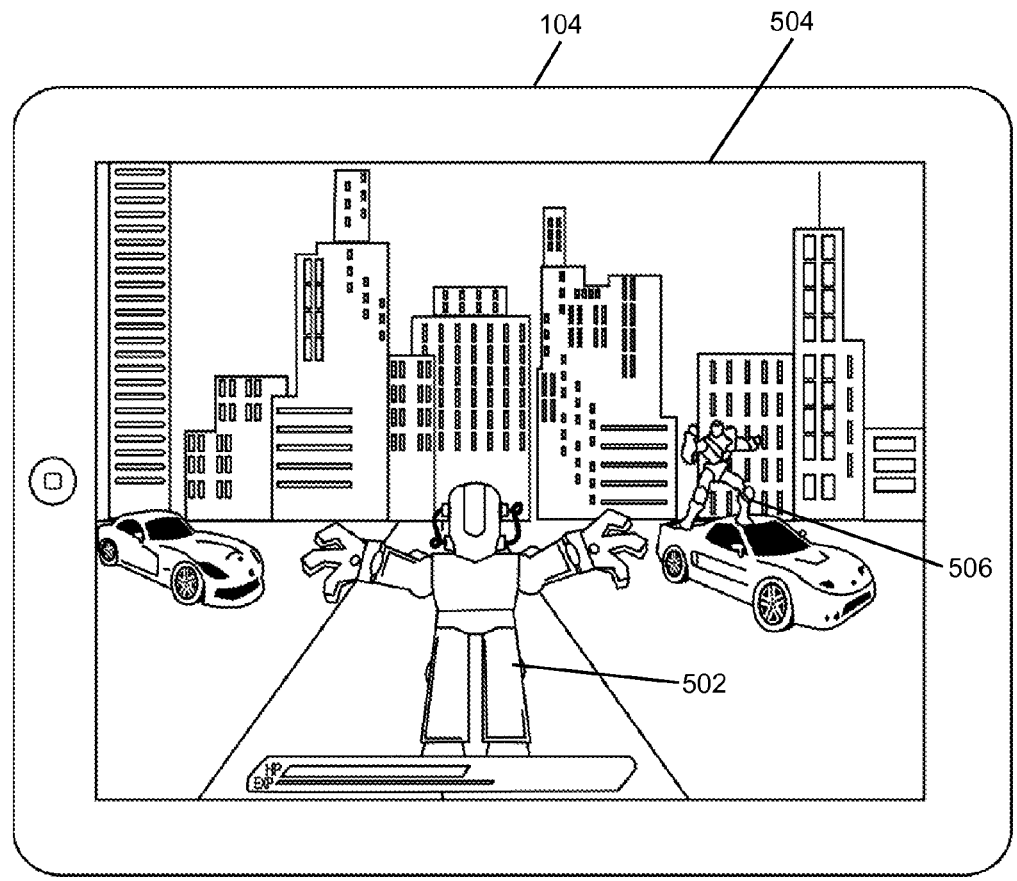
FIG. 5 is an exemplary illustration of a virtual character entity that represents an action figure in a virtual environment getting ready for battle with another virtual character entity, in accordance with an aspect of the invention.

In one scenario, with respect to FIG. 5, action figure 402 equipped with accessories 406a-406f may be represented in a virtual environment by virtual counterpart 502 equipped with virtual accessories that correspond to accessories 406a-406f. Poses, actions, or other aspects of virtual counterpart 502 may be controlled by interacting with action figure 402 or its accessories 406a-406f. As an example, when a user manipulates the hands and arms of action figure 402 such that the hands are at the level of the head of action figure 402, state/behavior management utilize sensor information obtained from sensors of action figure 406 at the time of the user manipulation to generate state information identifying the positions of the hands and arms relative to the body of action figure 402. The state information may subsequently be provided to virtual environment subsystem 112 that utilizes the state information to cause virtual counterpart 502 to exhibit a pose that reflects the relative positions of the hands and arms of action figure 402 identified in the state information. As shown in FIG. 5, for example, virtual counterpart is presented in the virtual environment with its hands and arms raised such that the hands are at the level of its head while getting ready to battle another character entity 506.

In an implementation, sensor information obtained from one or more sensors of action figure 106 (or other sensors) may comprise movement information related to a movement of action figure 106 (or parts thereof). The movement information may, for example, comprise directional information related to a direction of a movement of one or more moveable parts of action figure 106, distance information related to a distance covered by the movement of the moveable parts, velocity information related to a velocity of the movement of the moveable parts, acceleration information related to an acceleration of the movement of the moveable parts, or other information. In a further implementation, state/behavior management subsystem 144 may generate action figure state or behavior information based on the directional information, the distance information, the velocity information, the acceleration information, or other information.

As an example, the directional information, the distance information, the velocity information, or the acceleration information may be utilized to generate state information identifying a pose of action figure 106 (e.g., a pose identifier, positions and orientations of moveable parts relative to a body of action figure 106, or other information identifying a pose of action figure 106). In one use case, state/behavior management subsystem 144 may utilize a prior pose (or prior positions and orientations of action figure 106 or parts thereof) along with the movement information to determine a current pose of action figure 106. In another use case, other sensor information (or other information) may be utilized to determine a current pose of action figure 106.

As another example, the directional information, the distance information, the velocity information, or the acceleration information may be utilized to generate behavior information identifying one or more predefined movements performed by action figure 106 (e.g., predefined gestures, combination of movements by one or more moveable parts, etc.). In one use case, the predefined movements may correspond to one or more virtual actions executable by a virtual counterpart of action figure 106 in a virtual environment. For example, upon receipt of behavior information identifying a first predefined movement (e.g., circular rotation of arms of action figure 106 or other movement), virtual environment subsystem 112 may cause the virtual counterpart to execute a first virtual action corresponding to the predefined movement (e.g., a fireball attack or other action). A presentation of the virtual counterpart executing the corresponding first action in the virtual environment may be generated and provided to a user of user device 104.

Customization of Virtual Responses to Action Figure State/Behavior

In an implementation, developers (or other users) may be enabled to associate one or more states or behaviors of action figure types with one or more virtual states or behaviors of corresponding virtual counterpart types in a virtual environment such that, when action figures of the action figure types exhibit the states or behaviors, virtual counterparts of the action figures are caused to exhibit the virtual states or behaviors in the virtual environment, respectively. A given action figure type may, for example, comprise action figures that represent a given species or breed of character entities, action figures that represent a given character entity, etc.

As an example, a software development kit that enable developers to request the foregoing associations of the states or behaviors with the virtual states or behaviors for one or more virtual environments. Responsive to the association requests, one or more definitions indicating the foregoing associations may be stored so that, when action figure information identifying a state or behavior of an action figure is received, the stored definitions may be utilized to determine a corresponding virtual state or behavior for a virtual counterpart of the action figure to exhibit in the virtual environment. In this way, for example, control of virtual counterparts of action figures in one or more virtual environments may be customizable, for example, by developers of entities that design, create, or manufacture the action figures, the virtual counterparts, or the virtual environments, respectively. Additionally, or alternatively, control of virtual counterparts of action figures in one or more virtual environments may be customizable by users of the virtual environments.

It should be noted that, although implementations described herein are with respect to action figures and action figure types, it is understood that (to the extent possible) action figure accessories and accessory types may be used in place of action figures and accessory types, respectively. As an example, in some implementations, developers (or other users) may be enabled to associate one or more states or behaviors of action figure accessory types with one or more virtual states or behaviors of corresponding virtual counterpart types in a virtual environment such that, when action figure accessories of the action figure accessory types exhibit the states or behaviors, virtual counterparts of the action figure accessories are caused to exhibit the virtual states or behaviors in the virtual environment, respectively.

In an implementation, development management subsystem 118 may provide a software development kit that enables a developer to associate a state or behavior of an action figure type with a virtual state or behavior of a corresponding virtual counterpart in a virtual environment such that, when an action figure of the action figure type exhibits the state or behavior, a virtual counterpart of the action figure is caused to exhibit the virtual state or behavior in the virtual environment.

As an example, development management subsystem 118 may receive, via the software development kit, a request to associate a state or behavior, a first action figure type, and/or a first virtual state or behavior of a corresponding first virtual counterpart type in a virtual environment such that, when a first action figure of the first action figure type exhibits the state or behavior, a first virtual counterpart of the first action figure is caused to exhibit the first virtual state or behavior in the virtual environment. Responsive to receiving the association request, development management subsystem 118 may work with virtual counterpart management subsystem 114 or virtual action management subsystem 116 to store a first definition indicating the association of the state or behavior, the first action figure type, and/or the first virtual state or behavior with one another.

When first action figure information identifying the first action figure exhibiting the state or behavior is received, virtual environment subsystem 112 may utilize the first action figure information to identify a first virtual counterpart (of the first action figure in the virtual environment) and a corresponding virtual state or behavior for the first virtual counterpart. The first action figure information may, for example, comprise an identifier of the first action figure, information identifying the state or behavior with respect to one or more moveable parts of the first action figure, or other information. Virtual environment subsystem 112 may work with virtual counterpart management subsystem 114 to identify the first virtual counterpart based on the identifier of the first action figure (e.g., by querying a virtual counterpart database using the identifier), and with virtual action management subsystem 116 to identify the first virtual state or behavior based on the state or behavior (e.g., by obtaining the first definition by querying a database using the information identifying the state or behavior). Based on the identification of the first virtual counterpart and the first virtual state or behavior, a presentation of the first virtual counterpart exhibiting the first virtual state or behavior in the virtual environment may be provided.

As a further example, development management subsystem 118 may receive, via the software development kit, a request to associate the state or behavior, a second action figure type, and/or a second virtual state or behavior of a corresponding second virtual counterpart type in the virtual environment such that, when a second action figure of the second action figure type exhibits the state or behavior, a second virtual counterpart of the second action figure is caused to exhibit the second virtual state or behavior in the virtual environment. Responsive to receiving the association request, development management subsystem 118 may work with virtual counterpart management subsystem 114 or virtual action management subsystem 116 to store a second definition indicating the association of the state or behavior, the second action figure type, and/or the second virtual state or behavior with one another.

When second action figure information identifying the second action figure exhibiting the state or behavior is received, virtual environment subsystem 112 may utilize the second action figure information to identify a second virtual counterpart (of the second action figure in the virtual environment) and a corresponding virtual state or behavior for the second virtual counterpart. The second action figure information may, for example, comprise an identifier of the second action figure, information identifying the state or behavior with respect to one or more moveable parts of the second action figure, or other information. Virtual environment subsystem 112 may work with virtual counterpart management subsystem 114 to identify the second virtual counterpart based on the identifier of the second action figure (e.g., by querying a virtual counterpart database using the identifier), and with virtual action management subsystem 116 to identify the second virtual state or behavior based on the state or behavior (e.g., by obtaining the second definition by querying a database using the information identifying the state or behavior). Based on the identification of the second virtual counterpart and the second virtual state or behavior, a presentation of the second virtual counterpart exhibiting the second virtual state or behavior in the virtual environment may be provided.

In one use case, Table 1 below provides examples representing at least a portion of definitions that are stored based on requests (received from developers via a software development kit) to associate states or behaviors, action figure types, and virtual states or behaviors of corresponding virtual counterpart types in a virtual environment (e.g., Virtual Environment X). The definitions may, of course, comprise one or more additional attributes not shown in Table 1, and/or be without one or more of the attributes (e.g., state or behavior, action figure type, virtual state or behavior, virtual environment, etc.) shown in Table 1.

TABLE 1

| State or Behavior | Action FIG. Type | Virtual State or Behavior | Virtual Envr. |
| --- | --- | --- | --- |
| Arms Up in a Vertical Direction Relative to the Body | Action FIG. A | Meditation (Increased Healing Mode) | Virtual Environment X |
| Arms Up in a Vertical Direction Relative to the Body | Action FIG. B | Summoning for Help (E.g., Summoning Another Character to Assist in Battle) | Virtual Environment X |
| 90 Degree Rotation of Both Arms in a Down to Forward Motion | Action FIG. A | Blue Fireball Attack | Virtual Environment X |
| 90 Degree Rotation of Both Arms in a Down to Forward Motion | Action FIG. B | Red Fireball Attack | Virtual Environment X |
| ... | ... | ... | ... |

In an implementation, with respect to Table 1 above, a state or behavior associated with a first action figure type (e.g., Action Figure A) and a first virtual state or behavior (e.g., Meditation) of a corresponding first virtual counterpart type in a virtual environment (e.g., Virtual Environment X) may comprise a pose of an action figure (e.g., Arms Up in a Vertical Direction Relative to the Body). As indicated in Table 1 above, the state or behavior (or the pose of the action figure) may also be associated with a second action figure type (e.g., Action Figure B) and a second virtual state or behavior (e.g., Summoning for Help) of a corresponding second virtual counterpart type in the virtual environment. The association of the pose of the action figure, the first action figure type, and the first virtual state or behavior may be stored as at least part of one definition in a database responsive to a first association request. The association of the pose of the action figure, the second action figure type, and the second virtual state or behavior may be stored as at least part of another definition in the database responsive to a second association request.

In an implementation, with respect to Table 1 above, a state or behavior associated with a first action figure type (e.g., Action Figure A) and a first virtual state or behavior (e.g., Blue Fireball Attack) of a corresponding first virtual counterpart type in a virtual environment (e.g., Virtual Environment X) may comprise movement of a moveable part of an action figure (e.g., 90 Degree Rotation of Both Arms in a Down to Forward Motion). For example, the movement may comprise a movement pattern with respect to one or more moveable parts of the action figure (e.g., rotating both arms of the action figure in a 90 degree down to forward motion). As indicated in Table 1 above, the state or behavior (or the movement pattern) may also be associated with a second action figure type (e.g., Action Figure B) and a second virtual state or behavior (e.g., Red Fireball Attack) of a corresponding second virtual counterpart type in the virtual environment. The association of the movement pattern, the first action figure type, and the first virtual state or behavior may be stored as at least part of one definition in a database responsive to a first association request. The association of the movement pattern, the second action figure type, and the second virtual state or behavior may be stored as at least part of another definition in the database responsive to a second association request.

In an implementation, developers (or other users) may be enabled to customize control of virtual counterparts of action figures in multiple virtual environments. As an example, different virtual counterparts may represent a single action figure in the respective virtual environments in which the virtual counterparts exist. Each of the virtual counterparts may be associated with a set of virtual states or behaviors that is the same or different from one or more of the other sets of virtual states or behaviors associated with the other virtual counterparts. Development management subsystem 118 (and/or other components of system 100) may enable developers to associate a particular state or behavior of an action figure type with virtual states or behaviors of corresponding virtual counterpart types in the respective virtual environments such that, when an action figure of the action figure type exhibits the state or behavior during a session associated with one of the virtual environments, a virtual counterpart of the action figure in the virtual environment may be caused to exhibit the associated virtual state or behavior for the virtual environment.

In an implementation, a software development kit that enables a developer to associate a state or behavior of an action figure type with one or more virtual states or behaviors of corresponding virtual counterparts in one or more virtual environments may be provided. Such associations enabled by the software development kit may, for example, cause a virtual counterpart (of an action figure of the action figure type) in a respective virtual environment to exhibit an associated virtual state or behavior for the virtual environment.

As an example, development management subsystem 118 may receive, via the software development kit, a request to associate a state or behavior, an action figure type, and/or a first virtual state or behavior of a corresponding first virtual counterpart type in a first virtual environment such that, when an action figure of the action figure type exhibits the state or behavior, a first virtual counterpart of the action figure is caused to exhibit the first virtual state or behavior in the first virtual environment. Responsive to receiving the association request, development management subsystem 118 may work with virtual counterpart management subsystem 114 or virtual action management subsystem 116 to store a first definition indicating the association of the state or behavior, the action figure type, and/or the first virtual state or behavior with one another.

As another example, development management subsystem 117 may receive, via the software development kit, a request to associate the state or behavior, the action figure type, and/or a second virtual state or behavior of a corresponding second virtual counterpart type in a second virtual environment such that, when an action figure of the action figure type exhibits the state or behavior, a second virtual counterpart of the action figure is caused to exhibit the second virtual state or behavior in the virtual environment. Responsive to receiving the association request, development management subsystem 118 may work with virtual counterpart management subsystem 114 or virtual action management subsystem 116 to store a second definition indicating the association of the state or behavior, the second action figure type, and/or the second virtual state or behavior with one another. As such, multiple definitions (e.g., the foregoing first definition, second definition, or other definitions) indicating the associations of the same state or behavior of the same action figure type with different virtual states or behaviors for multiple virtual environments may be stored.

As a further example, when first action figure information identifying the action figure exhibiting the state or behavior is received (e.g., from the action figure) during a first session associated with the first virtual environment, virtual environment subsystem 112 may utilize the first action figure information to identify a first virtual counterpart (of the action figure in the first virtual environment) and a corresponding virtual state or behavior for the first virtual counterpart. The first action figure information may, for example, comprise an identifier of the action figure, information identifying the state or behavior with respect to one or more moveable parts of the first action figure, or other information. Virtual environment subsystem 112 may work with virtual counterpart management subsystem 114 to identify the first virtual counterpart based on the identifier of the action figure (e.g., by querying a virtual counterpart database using the identifier with respect to the first virtual environment), and with virtual action management subsystem 116 to identify the first virtual state or behavior based on the state or behavior (e.g., by obtaining the first definition by querying a database using the information identifying the state or behavior). Based on the identification of the first virtual counterpart and the first virtual state or behavior, a presentation of the first virtual counterpart exhibiting the first virtual state or behavior in the first virtual environment may be provided.

When second action figure information identifying the second action figure exhibiting the state or behavior is received (e.g., from the action figure) during a second session associated with the second virtual environment, virtual environment subsystem 112 may utilize the second action figure information to identify a second virtual counterpart (of the action figure in the second virtual environment) and a corresponding virtual state or behavior for the second virtual counterpart. The second action figure information may, for example, comprise an identifier of the action figure, information identifying the state or behavior with respect to one or more moveable parts of the action figure, or other information. Virtual environment subsystem 112 may work with virtual counterpart management subsystem 114 to identify the second virtual counterpart based on the identifier of the action figure (e.g., by querying a virtual counterpart database using the identifier), and with virtual action management subsystem 116 to identify the second virtual state or behavior based on the state or behavior (e.g., by obtaining the second definition by querying a database using the information identifying the state or behavior). Based on the identification of the second virtual counterpart and the second virtual state or behavior, a presentation of the second virtual counterpart exhibiting the second virtual state or behavior in the virtual environment may be provided.

In one scenario, Table 2 below provides examples representing at least a portion of definitions that are stored based on requests (received from developers via a software development kit) to associate states or behaviors, action figure types, and virtual states or behaviors of corresponding virtual counterpart types in multiple virtual environments (e.g., Virtual Environment X and Virtual Environment Y). The definitions may, of course, comprise one or more additional attributes not shown in Table 2, and/or be without one or more of the attributes (e.g., state or behavior, action figure type, virtual state or behavior, virtual environment, etc.) shown in Table 2.

TABLE 2

| State or Behavior | Action FIG. Type | Virtual State or Behavior | Virtual Envr. |
| --- | --- | --- | --- |
| Arms Up in a Vertical Direction Relative to the Body | Action FIG. A | Meditation (Increased Healing Mode) | Virtual Environment X |
| Arms Up in a Vertical Direction Relative to the Body | Action FIG. A | High Jump | Virtual Environment Y |
| 90 Degree Rotation of Both Arms in a Down to Forward Motion | Action FIG. A | Blue Fireball Attack | Virtual Environment X |
| 90 Degree Rotation of Both Arms in a Down to Forward Motion | Action FIG. A | Rapid Series of Punches | Virtual Environment Y |

TABLE 2-continued

| State or Behavior | Action FIG. Type | Virtual State or Behavior | Virtual Envr. |
|---|---|---|---|
| 90 Degree Rotation of Right Leg in a Down to Forward Motion | Action FIG. A | Blue Flaming Kick Attack | Virtual Environment X |
| 90 Degree Rotation of Right Leg in a Down to Forward Motion | Action FIG. A | Rotating Kick in a Tornado Fashion | Virtual Environment Y |
| ... | ... | ... | ... |

In an implementation, with respect to Table 2 above, a state or behavior associated with an action figure type (e.g., Action Figure A) and a first virtual state or behavior (e.g., Meditation) of a corresponding virtual counterpart type in a first virtual environment (e.g., Virtual Environment X) may comprise a pose of an action figure (e.g., Arms Up in a Vertical Direction Relative to the Body). As indicated in Table 2 above, the same pose and the same action figure type may also be associated with a second virtual state or behavior (e.g., High Jump) of a corresponding virtual counterpart type in a second virtual environment (e.g., Virtual Environment Y). The association of the pose of the action figure, the action figure type, and the first virtual state or behavior may be stored as at least part of one definition in a database responsive to a first association request. The association of the pose of the action figure, the action figure type, and the second virtual state or behavior may be stored as at least part of another definition in the database responsive to a second association request.

In an implementation, with respect to Table 2 above, a state or behavior associated with an action figure type (e.g., Action Figure A) and a first virtual state or behavior (e.g., Blue Fireball Attack, Blue Flaming Kick Attack, etc.) of a corresponding virtual counterpart type in a first virtual environment (e.g., Virtual Environment X) may comprise movement of a moveable part of an action figure (e.g., 90 Degree Rotation of Both Arms in a Down to Forward Motion, 90 Degree Rotation of Right Leg in a Down to Forward Motion, etc.). For example, the movement may comprise a movement pattern with respect to one or more moveable parts of the action figure (e.g., rotating both arms of the action figure in a 90 degree down to forward motion, rotating the right leg of the action figure in a 90 degree down to forward motion, etc.). As indicated in Table 2 above, the same state or behavior (or movement pattern) and action figure type may also be associated with a second virtual state or behavior (e.g., Rapid Series of Punches, Rotating Kick in a Tornado Fashion, etc.) of a corresponding virtual counterpart type in a second virtual environment. The association of the movement pattern, the action figure type, and the first virtual state or behavior may be stored as at least part of one definition in a database responsive to a first association request. The association of the movement pattern, the action figure type, and the second virtual state or behavior may be stored as at least part of another definition in the database responsive to a second association request.

Exemplary Data Flow

Figure 6:
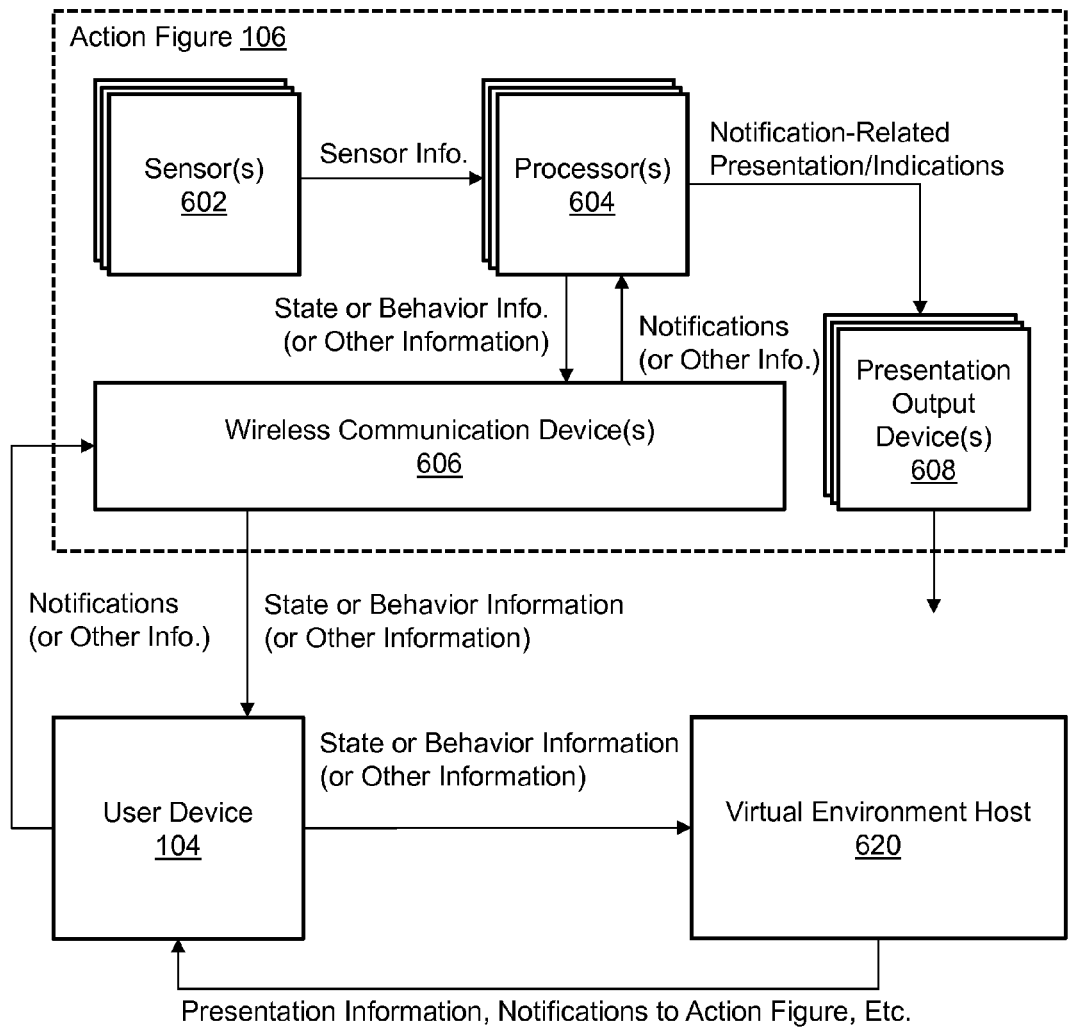
FIG. 6 is an exemplary illustration of a data flow related to providing interactive action figures or action figure accessories that have corresponding virtual counterparts in a virtual environment, in accordance with an aspect of the invention.

FIG. 6 is an exemplary illustration of a data flow related to providing interactive action figures or action figure accessories that have corresponding virtual counterparts in a virtual environment, in accordance with an aspect of the invention.

As an example, with respect to FIG. 6, sensor information collected by sensor(s) 602 may be provided to processor(s) 604. Processor(s) 604 may utilize the sensor information to generate state or behavior information, and provide the state or behavior information to user device 104 via wireless communication device(s) 606. User device 104 may relay the state or behavior information to virtual environment host 620 that processes the state or behavior information to determine poses, actions, other aspects to be exhibited by a virtual counterpart of action figure 106 in a virtual environment. Based on such determinations, virtual environment host 620 may generate a presentation of the virtual counterpart and the virtual environment, and provide the presentation to user device 104 for display to a user of the virtual environment. A virtual environment host may, for example, comprise one or more virtual universe servers, game servers, or other components that host the virtual environment (e.g., a virtual space, a game space, a virtual universe, or other virtual environment).

As another example, with respect to FIG. 6, virtual environment host 620 may provide notifications to action figure 106 via user device 104. Processor(s) 604 may process the notifications to generate a presentation (or indications) related to the notifications that provided to a user of the virtual environment via presentation output device(s) 608.

Exemplary Flowcharts

Figure 7:
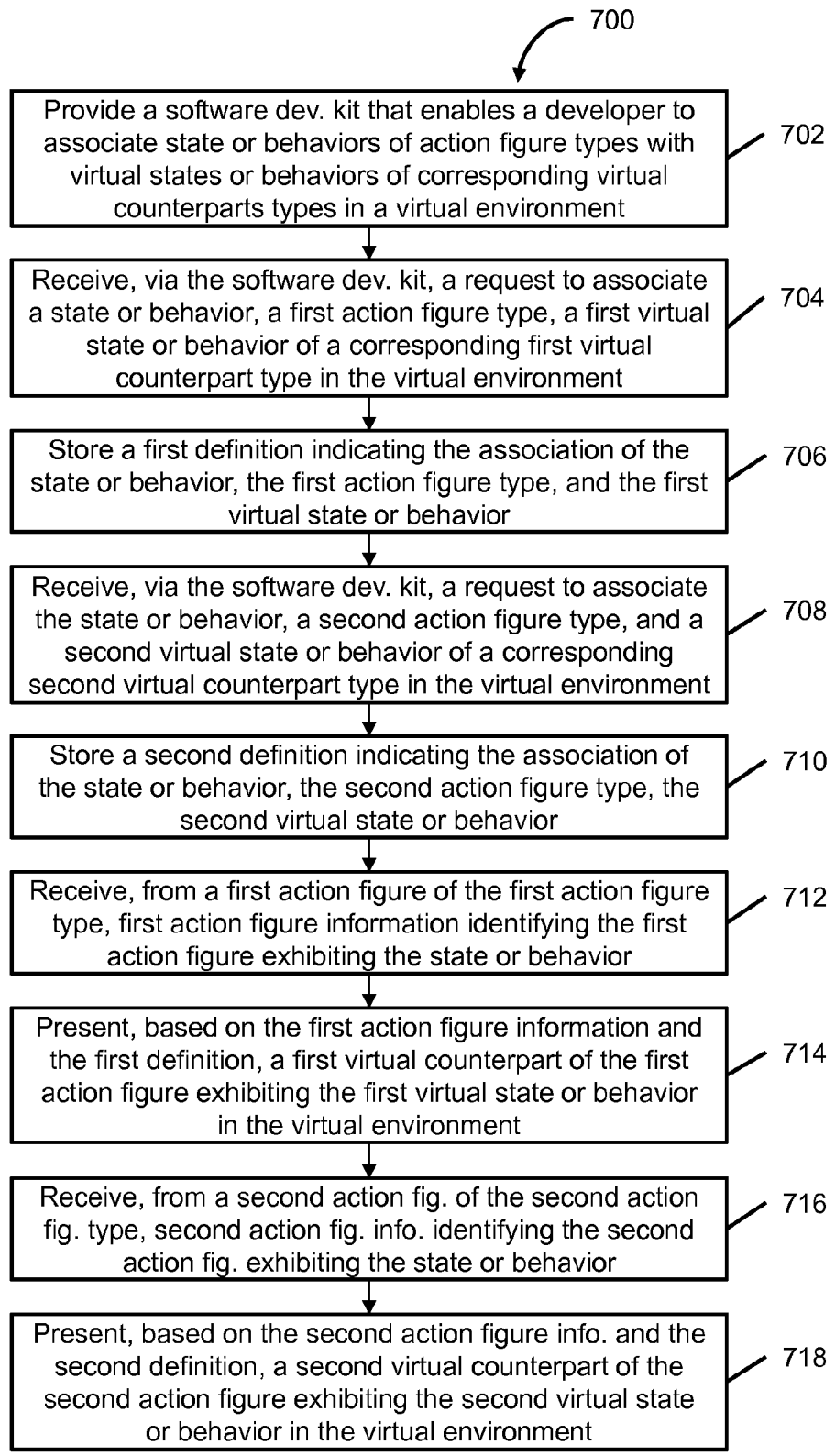
FIG. 7 is an exemplary illustration of a flowchart of a method of providing a software development kit to enable configuration of virtual counterparts of action figures, in accordance with an aspect of the invention.
Figure 8:
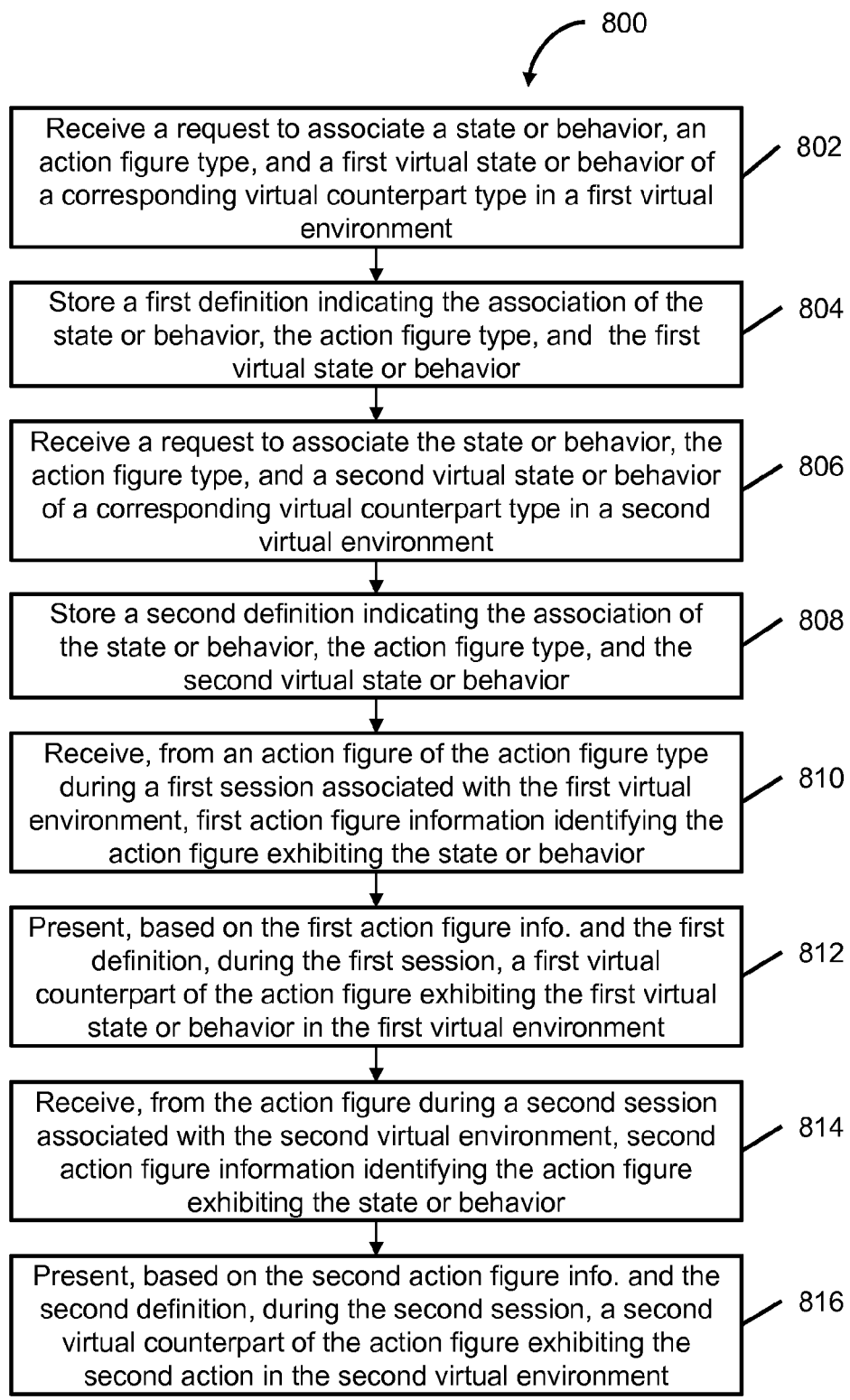
FIG. 8 is an exemplary illustration of a flowchart of a method of facilitating custom control of virtual counterparts of action figures in multiple virtual environments, in accordance with an aspect of the invention.

FIGS. 7 and 8 comprise exemplary illustrations of flowcharts of processing operations of methods that enable the various features and functionality of the system as described in detail above. The processing operations of each method presented below are intended to be illustrative and non-limiting. In some implementations, for example, the methods may be accomplished with one or more additional operations not described, and/or without one or more of the operations discussed. Additionally, the order in which the processing operations of the methods are illustrated (and described below) is not intended to be limiting.

In some implementations, the methods may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the methods in response to instructions stored electronically on an electronic storage medium. The one or more processing devices may include one or more devices configured through hardware, firmware, and/or software to be specifically designed for execution of one or more of the operations of the methods.

FIG. 7 is an exemplary illustration of a flowchart of a method 700 of providing a software development kit to enable configuration of virtual counterparts of action figures, in accordance with an aspect of the invention.

In an operation 702, a software development kit that enables a developer to associate one or more states or behaviors of action figure types with one or more virtual states or behaviors of corresponding virtual counterpart types in a virtual environment may be provided. As an example, the association of the states or behaviors with the virtual states or behaviors may cause virtual counterparts of action figures of the action figure types to exhibit the virtual states or behaviors in the virtual environment when the action figures exhibit the states or behaviors, respectively. Operation 702 may be performed by a development management subsystem that is the same as or similar to development management subsystem 118, in accordance with one or more implementations.

In an operation 704, a request to associate a state or behavior, a first action figure type, a first virtual state or behavior of a corresponding virtual counterpart type in the virtual environment may be received via the software development kit. The request to associate the foregoing items may, for example, comprise a request to associate the foregoing items such that, when a first action figure of the first action figure type exhibits the state or behavior, a first virtual counterpart of the first action figure is caused to exhibit the first virtual state or behavior in the virtual environment. Operation 704 may be performed by a virtual counterpart management subsystem or virtual action management subsystem that are the same as or similar to virtual counterpart management subsystem 114 or virtual action management subsystem 116, in accordance with one or more implementations.

In an operation 706, a first definition may be stored based on the request to associate the state or behavior, the first action figure type, and the first virtual state or behavior. As an example, the stored first definition may indicate the association of the state or behavior, the first action figure type, and the first virtual state or behavior. Operation 706 may be performed by a virtual counterpart management subsystem or virtual action management subsystem that are the same as or similar to virtual counterpart management subsystem 114 or virtual action management subsystem 116, in accordance with one or more implementations.

In an operation 708, a request to associate the state or behavior, a second action figure type, and a second virtual state or behavior of a corresponding second virtual counterpart in the virtual environment may be received via the software development kit. The request to associate the foregoing items may, for example, comprise a request to associate the foregoing items such that, when a second action figure of the second action figure type exhibits the state or behavior, a second virtual counterpart of the second action figure is caused to exhibit the second virtual state or behavior in the virtual environment. Operation 708 may be performed by a virtual counterpart management subsystem or virtual action management subsystem that are the same as or similar to virtual counterpart management subsystem 114 or virtual action management subsystem 116, in accordance with one or more implementations.

In an operation 710, a second definition may be stored based on the request to associate the state or behavior, the second action figure type, and the second virtual state or behavior. As an example, the second definition may indicate the association of the state or behavior, the second action figure type, and the second virtual state or behavior. Operation 710 may be performed by a virtual counterpart management subsystem or virtual action management subsystem that are the same as or similar to virtual counterpart management subsystem 114 or virtual action management subsystem 116, in accordance with one or more implementations.

In an operation 712, first action figure information (identifying the first action figure exhibiting the state or behavior) may be received from the first action figure (of the first action figure type). As an example, the first action figure information may comprise an identifier of the first action figure, information identifying the state or behavior with respect to one or more moveable parts of the first action figure, or other information. The moveable parts of the first action figure may comprise moveable appendages of the first action figure or other moveable parts. Operation 712 may be performed by a virtual environment subsystem that is the same as or similar to virtual environment subsystem 112, in accordance with one or more implementations.

In an operation 714, a presentation of a first virtual counterpart of the first action figure exhibiting the first state or behavior in the virtual environment may be provided based on the first action figure information and the first definition. Operation 714 may be performed by a virtual environment subsystem that is the same as or similar to virtual environment subsystem 112, in accordance with one or more implementations.

In an operation 716, second action figure information (identifying the second action figure exhibiting the state or behavior) may be received from the second action figure (of the second action figure type). As an example, the second action figure information may comprise an identifier of the second action figure, information identifying the state or behavior with respect to one or more moveable parts of the second action figure, or other information. The moveable parts of the second action figure may comprise moveable appendages of the second action figure or other moveable parts. Operation 716 may be performed by a virtual environment subsystem that is the same as or similar to virtual environment subsystem 112, in accordance with one or more implementations.

In an operation 718, a presentation of a second virtual counterpart of the second action figure exhibiting the second virtual state or behavior in the virtual environment may be provided based on the second action figure information and the second definition. Operation 718 may be performed by a virtual environment subsystem that is the same as or similar to virtual environment subsystem 112, in accordance with one or more implementations.

FIG. 8 is an exemplary illustration of a flowchart of a method 800 of facilitating custom control of virtual counterparts of action figures in multiple virtual environments, in accordance with an aspect of the invention.

In an operation 802, a request to associate a state or behavior, an action figure type, and a first virtual state or behavior of a corresponding virtual counterpart type in a first virtual environment may be received. The request to associate the foregoing items may, for example, comprise a request to associate the foregoing items such that, when an action figure of the action figure type exhibits the state or behavior, a first virtual counterpart of the action figure in the first virtual environment is caused to exhibit the first virtual state or behavior. Operation 802 may be performed by a development management subsystem that is the same as or similar to development management subsystem 118, in accordance with one or more implementations.

In an operation 804, a first definition may be stored based on the request to associate the state or behavior, the action figure type, and the first virtual or behavior. As an example, the stored first definition may indicate the association of the state or behavior, the action figure type, and the first virtual state or behavior. Operation 804 may be performed by a virtual counterpart management subsystem or virtual action management subsystem that are the same as or similar to virtual counterpart management subsystem 114 or virtual action management subsystem 116, in accordance with one or more implementations.

In an operation 806, a request to associate the state or behavior, the action figure type, and a second virtual state or behavior of a corresponding virtual counterpart in a second virtual environment may be received. The request to associate the foregoing items may, for example, comprise a request to associate the foregoing items such, when the action figure exhibits the state or behavior, a second virtual counterpart of the action figure in the second virtual environment is caused to exhibit the second virtual state or behavior. Operation 806 may be performed by a development management subsystem that is the same as or similar to development management subsystem 118, in accordance with one or more implementations.

In an operation 808, a second definition may be stored based on the request to associate the state or behavior, the action figure type, and the second virtual state or behavior. As an example, the second definition may indicate the association of the state or behavior, the action figure type, and the second virtual state or behavior. Operation 808 may be performed by a virtual counterpart management subsystem or virtual action management subsystem that are the same as or similar to virtual counterpart management subsystem 114 or virtual action management subsystem 116, in accordance with one or more implementations.

In an operation 810, first action figure information (identifying the action figure exhibiting the state or behavior) may be received from the action figure during a first session associated with the first virtual environment. As an example, the first action figure information may comprise an identifier of the action figure, information identifying the state or behavior with respect to one or more moveable parts of the action figure, or other information. The moveable parts of the action figure may comprise moveable appendages of the action figure or other moveable parts. Operation 810 may be performed by a virtual environment subsystem that is the same as or similar to virtual environment subsystem 112, in accordance with one or more implementations.

In an operation 812, a presentation of the first virtual counterpart (of the action figure in the first virtual environment) exhibiting the first virtual state or behavior in the first virtual environment may be provided based on the first action figure information and the first definition. Operation 812 may be performed by a virtual environment subsystem that is the same as or similar to virtual environment subsystem 112, in accordance with one or more implementations.

In an operation 814, second action figure information (identifying the action figure exhibiting the state or behavior) may be received from the action figure during a second session associated with the second virtual environment. As an example, the second action figure information may comprise an identifier of the action figure, information identifying the state or behavior with respect to the moveable parts of the action figure, or other information. Operation 814 may be performed by a virtual environment subsystem that is the same as or similar to virtual environment subsystem 112, in accordance with one or more implementations.

In an operation 816, a presentation of the second virtual counterpart (of the action figure in the second virtual environment) exhibiting the second virtual state or behavior in the second virtual environment may be provided based on the second action figure information and the second definition. Operation 816 may be performed by a virtual environment subsystem that is the same as or similar to virtual environment subsystem 112, in accordance with one or more implementations.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the scope of the appended claims. For example, it is to be understood that the present invention contemplates that, to the extent possible, one or more features of any implementation can be combined with one or more features of any other implementation.

What is claimed is:

1. A method of providing a software development kit to enable configuration of virtual counterparts of action figures, the method being implemented on a computer system that includes one or more physical processors executing computer program instructions, which when executed, perform the method, the method comprising:

providing, by the computer system, a software development kit that enables a developer to associate a state or behavior of an action figure type with a virtual state or behavior in a virtual environment such that, when an action figure of the action figure type exhibits the state or behavior, a virtual counterpart of the action figure is caused to exhibit the virtual state or behavior in the virtual environment;

receiving, at the computer system, via the software development kit, a first request to associate a first state or behavior, a first action figure type, and a first virtual state or behavior in a first virtual environment such that, when a first action figure of the first action figure type exhibits the first state or behavior, a first virtual counterpart of the first action figure is caused to exhibit the first virtual state or behavior in the first virtual environment;

storing, by the computer system, a first definition indicating the association of the first state or behavior, the first action figure type, and the first virtual state or behavior;

receiving, at the computer system, via the software development kit, a second request to associate the first state or behavior, the first action figure type, and a second virtual state or behavior in a second virtual environment such that, when the first action figure of the first action figure type exhibits the first state or behavior, a second virtual counterpart of the first action figure is caused to exhibit the second virtual state or behavior in the second virtual environment, wherein the second virtual state or behavior is different from the first virtual state or behavior, and the second virtual environment is different from the first virtual environment;

storing, by the computer system, a second definition indicating the association of the first state or behavior, the first action figure type, and the second virtual state or behavior;

receiving, at the computer system, from the first action figure, during a first session associated with the first virtual environment, first action figure information identifying the first state or behavior exhibited by the first action figure during the first session;

causing, by the computer system, based on the first action figure information and the first definition, the first virtual counterpart of the first action figure to exhibit the first virtual state or behavior in the first virtual environment;

receiving, at the computer system, from the first action figure, during a second session associated with the second virtual environment, second action figure information identifying the first state or behavior exhibited by the first action figure during the second session; and causing, by the computer system, based on the second action figure information and the second definition, the second virtual counterpart of the first action figure to exhibit the second virtual state or behavior in the second virtual environment.

2. The method of claim 1, wherein the first action figure information identifies the first state or behavior exhibited by the first action figure during the first session with respect to one or more first moveable parts of the first action figure.

3. The method of claim 1, wherein the first state or behavior comprises a first state corresponding to a first pose with respect to one or more first moveable parts of the first action figure.

4. The method of claim 1, wherein the first state or behavior comprises a first behavior corresponding to movement of a first moveable part of the first action figure in a first direction.

5. The method of claim 1, wherein the first state or behavior comprises a first behavior corresponding to a first movement pattern with respect to one or more first moveable parts of the first action figure.

6. A system for providing a software development kit to enable configuration of virtual counterparts of action figures, the system comprising:
   one or more physical processors programmed to execute computer program instructions which, when executed, cause the one or more physical processors to:
   provide a software development kit that enables a developer to associate a state or behavior of an action figure type with a virtual state or behavior in a virtual environment such that, when an action figure of the action figure type exhibits the state or behavior, a virtual counterpart of the action figure is caused to exhibit the virtual state or behavior in the virtual environment;
   receive, via the software development kit, a first request to associate a first state or behavior, a first action figure type, and a first virtual state or behavior in a first virtual environment such that, when a first action figure of the first action figure type exhibits the first state or behavior, a first virtual counterpart of the first action figure is caused to exhibit the first virtual state or behavior in the first virtual environment;
   store a first definition indicating the association of the first state or behavior, the first action figure type, and the first virtual state or behavior;
   receive, via the software development kit, a second request to associate the first state or behavior, the first action figure type, and a second virtual state or behavior in a second virtual environment such that, when the first action figure of the first action figure type exhibits the first state or behavior, a second virtual counterpart of the first action figure is caused to exhibit the second virtual state or behavior in the second virtual environment, wherein the second virtual state or behavior is different from the first virtual state or behavior, and the second virtual environment is different from the first virtual environment;
   store a second definition indicating the association of the first state or behavior, the first action figure type, and the second virtual state or behavior;
   receive, from the first action figure, during a first session associated with the first virtual environment, first action figure information identifying the first state or behavior exhibited by the first action figure during the first session;
   cause, based on the first action figure information and the first definition, the first virtual counterpart of the first action figure to exhibit the first virtual state or behavior in the first virtual environment;
   receive, from the first action figure, during a second session associated with the second virtual environment, second action figure information identifying the first state or behavior exhibited by the first action figure during the second session; and
   cause, based on the second action figure information and the second definition, the second virtual counterpart of the first action figure to exhibit the second virtual state or behavior in the second virtual environment.

7. The system of claim 6, wherein the first action figure information identifies the first state or behavior exhibited by the first action figure during the first session with respect to one or more first moveable parts of the first action figure.

8. The system of claim 6, wherein the first state or behavior comprises a first state corresponding to a first pose with respect to one or more first moveable parts of the first action figure.

9. The system of claim 6, wherein the first state or behavior comprises a first behavior corresponding to movement of a first moveable part of the first action figure in a first direction.

10. The system of claim 6, wherein the first state or behavior comprises a first behavior corresponding to a first movement pattern with respect to one or more first moveable parts of the first action figure.

* * * * *